(12) United States Patent
Gschwind

(10) Patent No.: US 7,900,025 B2
(45) Date of Patent: Mar. 1, 2011

(54) FLOATING POINT ONLY SIMD INSTRUCTION SET ARCHITECTURE INCLUDING COMPARE, SELECT, BOOLEAN, AND ALIGNMENT OPERATIONS

(75) Inventor: Michael K. Gschwind, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 13 days.

(21) Appl. No.: 12/250,575

(22) Filed: Oct. 14, 2008

(65) Prior Publication Data

US 2010/0095097 A1  Apr. 15, 2010

(51) Int. Cl.
*G06F 9/305* (2006.01)

(52) U.S. Cl. .................................. 712/222; 712/22

(58) Field of Classification Search .................. None
See application file for complete search history.

(56) References Cited

U.S. PATENT DOCUMENTS

| | | | |
|---|---|---|---|
| 3,389,379 A | | 6/1968 | Erickson et al. |
| 5,646,875 A | | 7/1997 | Taborn et al. |
| 5,933,650 A | | 8/1999 | van Hook et al. |
| 6,317,824 B1 | * | 11/2001 | Thakkar et al. ............. 712/222 |
| 6,839,828 B2 | * | 1/2005 | Gschwind et al. ............. 712/20 |
| 2007/0011441 A1 | | 1/2007 | Eichenberger et al. |
| 2008/0034357 A1 | | 2/2008 | Gschwind |
| 2009/0037694 A1 | | 2/2009 | Luick et al. |
| 2009/0049113 A1 | * | 2/2009 | Muff et al. .................. 708/524 |
| 2009/0198966 A1 | | 8/2009 | Gschwind et al. |
| 2009/0198977 A1 | | 8/2009 | Gschwind et al. |
| 2009/0307656 A1 | | 12/2009 | Eichenberger et al. |
| 2010/0095086 A1 | | 4/2010 | Eichenberger et al. |
| 2010/0095087 A1 | | 4/2010 | Eichenberger et al. |
| 2010/0095098 A1 | | 4/2010 | Gschwind |
| 2010/0095285 A1 | | 4/2010 | Gschwind |

OTHER PUBLICATIONS

"Power ISA, Version 2.04", IBM Corporation, Apr. 3, 2007, accessible at http://www.power.org/resources/downloads/PowerISA_203.Public.pdf, 874 pages (21 pages submitted herewith).

"Synergistic Processor Unit Instruction Set Architecture, Version 1.2", IBM Corporation, Jan. 27, 2007, http://www-01.ibm.com/chips/techlib/techlib.nsf/techdocs/76CA6C7304210F3987257060006F2C44/$file/SPU_ISA_v1.2_27Jan2007_pub.pdf, 279 pages.

(Continued)

*Primary Examiner*—Kenneth S Kim
(74) *Attorney, Agent, or Firm*—Stephen J. Walder, Jr.; Kenneth R. Corsello; William J. Stock

(57) ABSTRACT

Mechanisms for implementing a floating point only single instruction multiple data instruction set architecture are provided. A processor is provided that comprises an issue unit, an execution unit coupled to the issue unit, and a vector register file coupled to the execution unit. The execution unit has logic that implements a floating point (FP) only single instruction multiple data (SIMD) instruction set architecture (ISA). The floating point vector registers of the vector register file store both scalar and floating point values as vectors having a plurality of vector elements. The processor may be part of a data processing system.

23 Claims, 13 Drawing Sheets

OTHER PUBLICATIONS

"The VIS Instruction Set, Version 1.0", Sun Microsystems Inc., A White Paper, Jun. 2002, 34 pages.

Bachega, Leonardo et al., "A High-Performance SIMD Floating Point Unit for BlueGene/L: Architecture, Compilation, and Algorithm Design", Proceedings of the 13th International Conference on Parallel Architecture and Compilation Techniques (PACT'04), pp. 1-12, 2004.

Eichenberger, Alexandre E. et al., "Optimizing Compiler for a CELL Processor", IEEE, PACT'05, 2005, http://domino.research.ibm.com/comm/research_projects.nsf/pages/cellcompiler.refs.html/$FILE/paper-eichen-pact05.pdf, 12 pages.

Eichenberger, Alexandre E. et al., "Using advanced compiler technology to exploit the performance of the Cell Broadband Engine architecture", IBM Corporation, IBM Systems Journal, vol. 45, No. 1, 2006, http:www.research.ibm.com/journals/sj/451/eichenberger.pdf, pp. 59-84.

Gibbs, Ben et al., "IBM eServer BladeCenter JS20 PowerPc 970 Programming Environment", Jan. 2005, www.redbooks.ibm.com/redpapers/pdfs/redp3890.pdf, 140 pages.

Gschwind, Michael et al., "Synergistic Processing in Cell's Multicore Architecture", IEEE Micro, vol. 26, No. 2, 2006, pp. 10-24.

Thompson, Tom, "AltiVec Revealed", MACTECH, vol. 15, No. 7, 1999, http://www.mactech.com/articles/mactech/Vol.15/15.07/AltiVecRevealed/, 19 pages.

Wait, C.D., "IBM PowerPC 440 FPU with complex-arithmetic extensions", IBM Corporation, IBM J. Res. & Dev., vol. 49, No. 2/3, Mar./May 2005, http://www.research.ibm.com/journal/rd/492/wait.pdf, pp. 249-254.

Bik, Aart J.C. et al., "Automatic Intra-Register Vectorization for the Intel Architecture", International Journal of Parallel Programming, vol. 30, No. 2, Apr. 2002, pp. 65-98.

Eichenberger, Alexandre et al., "Vectorization for SIMD Architectures with Alignment Constraints", Proceedings of the Conference on Programming Language Design and Implementation (PLDI), 2004, 12 pages.

Wu, Peng et al., "An Integrated Simdization Framework Using Virtual Vectors", Proceedings of the International Conference on Supercomputing (ICS), 2005, 10 pages.

Wu, Peng et al., "Efficient SIMD Code Generation for Runtime Alignment and Length Conversion", Proceedings of the International Symposium on Code Generation and Optimization (CGO), 2005, 12 pages.

"Intel 64 and IA-32 Architectures Software Developer's Manual, vol. 1: Basic Architecture", Intel Corporation, Sep. 2008, http://downioad.intel.com/design/processor/manuals/253665.pdf, 496 pages. (23 pages submitted Herewith.).

Gschwind, Michael K., "Array Reference Safety Analysis in the Presence of Loops with Conditional Control Flow", U.S. Appl. No. 12/250,562, filed Oct. 14, 2008.

Gschwind, Michael K., "Generating and Executing Programs for a Floating Point Single Instruction Multiple Data Instruction Set Architecture", U.S. Appl. No. 12/250,581, filed Oct. 14, 2008.

Eichenberger, Alexandre E. et al., "Dynamic Data Driven Alignment and Data Formatting in a Floating-Point SIMD Architecture", U.S. Appl. No. 12/250,584, filed Oct. 14, 2008.

Eichenberger, Alexandre E. et al., "Dynamically Aligning Enhanced Precision Vectors Based on Addresses Corresponding to Reduced Precision Vectors", U.S. Appl. No. 12/250,599, filed Oct. 14, 2008.

U.S. Appl. No. 12/250,562, Image File Wrapper printed Jul. 16, 2010, 2 pages.

U.S. Appl. No. 12/250,581, Image File Wrapper printed Jul. 16, 2010, 2 pages.

U.S. Appl. No. 12/250,584, Image File Wrapper printed Jul. 16, 2010, 2 pages.

U.S. Appl. No. 12/250,599, Image File Wrapper printed Jul. 16, 2010, 2 pages.

Notice of Allowance mailed Aug. 27, 2010 for U.S. Appl. No. 12/250,599, 6 pages.

Response to Office Action filed Aug. 20, 2010, U.S. Appl. No. 12/250,599, 16 pages.

* cited by examiner

FLOATING POINT ONLY SIMD INSTRUCTION SET ARCHITECTURE INCLUDING COMPARE, SELECT, BOOLEAN, AND ALIGNMENT OPERATIONS

GOVERNMENT RIGHTS

This invention was made with United States Government support under Contract No. B554331 awarded by the Department of Energy. THE GOVERNMENT HAS CERTAIN RIGHTS IN THIS INVENTION.

BACKGROUND OF THE INVENTION

1. Field of the Invention

The present application relates generally to an improved data processing apparatus and method and more specifically to mechanisms for implementing a floating point only single instruction multiple data instruction set architecture are provided.

2. Background of the Invention

In known systems, data parallel single instruction multiple data (SIMD) architectures with floating point support have either been a floating point only type system in which all instructions must be of a floating point type and only floating point type instructions may access the register file, or have supported a polymorphic type system in which both floating point and integer instructions may be included in the instruction stream and may execute on the register file(s). "Pure breed" floating point SIMD instruction sets provide the benefit of having a single data type and instruction type simplify the implementation due to the absence of variation in data type and instruction type. Pure breed floating point SIMD instruction sets have not, in practice, been utilized, however, because they have limited functionality. That is, with pure breed floating point SIMD instruction sets, i.e., floating point only instruction sets, there is no capability to encode Boolean values and control words, e.g., a "permute" control word. Because there are no Boolean floating point or vector operations, the floating point SIMD only instruction sets limit the ability to perform data-parallel if conversion and further limit the ability to compose complex conditions for data-parallel select operations. Moreover, with such floating point only SIMD instruction sets, there are no compare operations which limit the architecture's ability to perform comparisons and compose complex conditions for data-parallel select operations. Since there are no vector permute operations, the floating point only SIMD instruction sets are limited in their ability to handle dynamic data reorganization to handle unaligned accesses and other data reorganization operations.

Because of these significant limitations, in practice, non-SIMD floating point only instruction set architectures (ISAs), i.e. polymorphic ISAs, and paired floating point ISAs targeting complex arithmetic have been utilized. Paired floating point ISAs are limited in much the same manner as floating point only SIMD ISAs with regard to data parallel if-conversion, flexible data arrangement, and handling of data of unknown alignment or known misalignment. Polymorphic ISAs allow multiple different data types to be overlaid, i.e., both floating point and integer data types may be used, in a single vector register file. While polymorphic ISAs allow different data types, and thus, different instruction types, i.e., floating point and integer, there is a large amount of overhead associated with handling different data types and different instruction types. For example, polymorphic ISAs typically require conversion of data types from one type to another to perform certain operations and then a conversion back.

Several polymorphically typed instruction sets have implemented a byte-wise permute instruction. For example, in the Power ISA and AltiVec instruction set, the vector permute (vperm) instruction is provided and in the Cell SPE instruction set, the shuffle byte (shufb) instruction is provided, all available from International Business Machines Corporation of Armonk, N.Y. These permute instructions can be used to dynamically align data elements, such as described in Gschwind et al., "Synergistic Processing in Cell's Multicore Architecture", IEEE Micro, Vol 26, No. 2, pages 10-24, 2006. That is, the permute instruction allows any byte to be moved to any other place in a vector. Thus, for example, two aligned vectors may be loaded that overlap a misaligned vector which can be shuffled to get an aligned value. Unfortunately, such a permute instruction cannot be performed as a floating point operation but instead requires that the floating point vector values be converted to integers, the shuffle or permute operation is performed on the integer values, and then the result is converted back to a floating point vector value.

While polymorphically typed instruction sets provide a byte-wise permute instruction that allows data to be realigned from an arbitrary byte-alignment position, such byte-wise data rearrangement is expensive and requires large area and power. Moreover, polymorphically typed vector environments are more complex to build, have higher verification costs, have more critical paths, and may require dynamic data conversions to account for possibly different internal representations being used for floating point and integer data types. Furthermore, while natural vector element alignment can be enforced by the compiler and suitable programming language bindings, vector alignment at vector alignment boundaries cannot be enforced by the compiler and bindings because vectors are not data types in most programming languages, and hence programmers will be unable to affect the alignment of vectors directly. Even when vectors are made available as language extensions, programmers may find that algorithmic requirements force the use of vector subranges that may be not naturally aligned with respect to hardware vector register lengths.

Data parallel floating point oriented SIMD ISAs are more efficient than polymorphically typed instruction sets because they reduce the cost of implementation for application optimized systems with a floating point focus. However, data parallel floating point oriented SIMD ISAs do not offer dynamic data driven alignment and dynamic data driven formatting because data realignment is not consistent with the operation of floating point data paths, i.e., (1) floating point numbers treat a consecutive number of bytes as a single entity without a capability to separately address bytes within a floating point number, and (2) no known representation for encoding a desired data rearrangement is known.

BRIEF SUMMARY OF THE INVENTION

In one illustrative embodiment, a processor is provided that comprises an issue unit, an execution unit coupled to the issue unit, and a vector register file coupled to the execution unit. The execution unit has logic that implements a floating point (FP) only single instruction multiple data (SIMD) instruction set architecture (ISA). The floating point vector registers of the vector register file store both scalar and floating point values as vectors having a plurality of vector elements.

In another illustrative embodiment, a data processing system is provided that comprises a processor and a memory coupled to the processor. The processor comprises an issue unit, an execution unit coupled to the issue unit, and a vector register file coupled to the execution unit. The execution unit has logic that implements a floating point (FP) only single instruction multiple data (SIMD) instruction set architecture (ISA). The floating point vector registers of the vector register file store both scalar and floating point values as vectors having a plurality of vector elements.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

Figure 1:
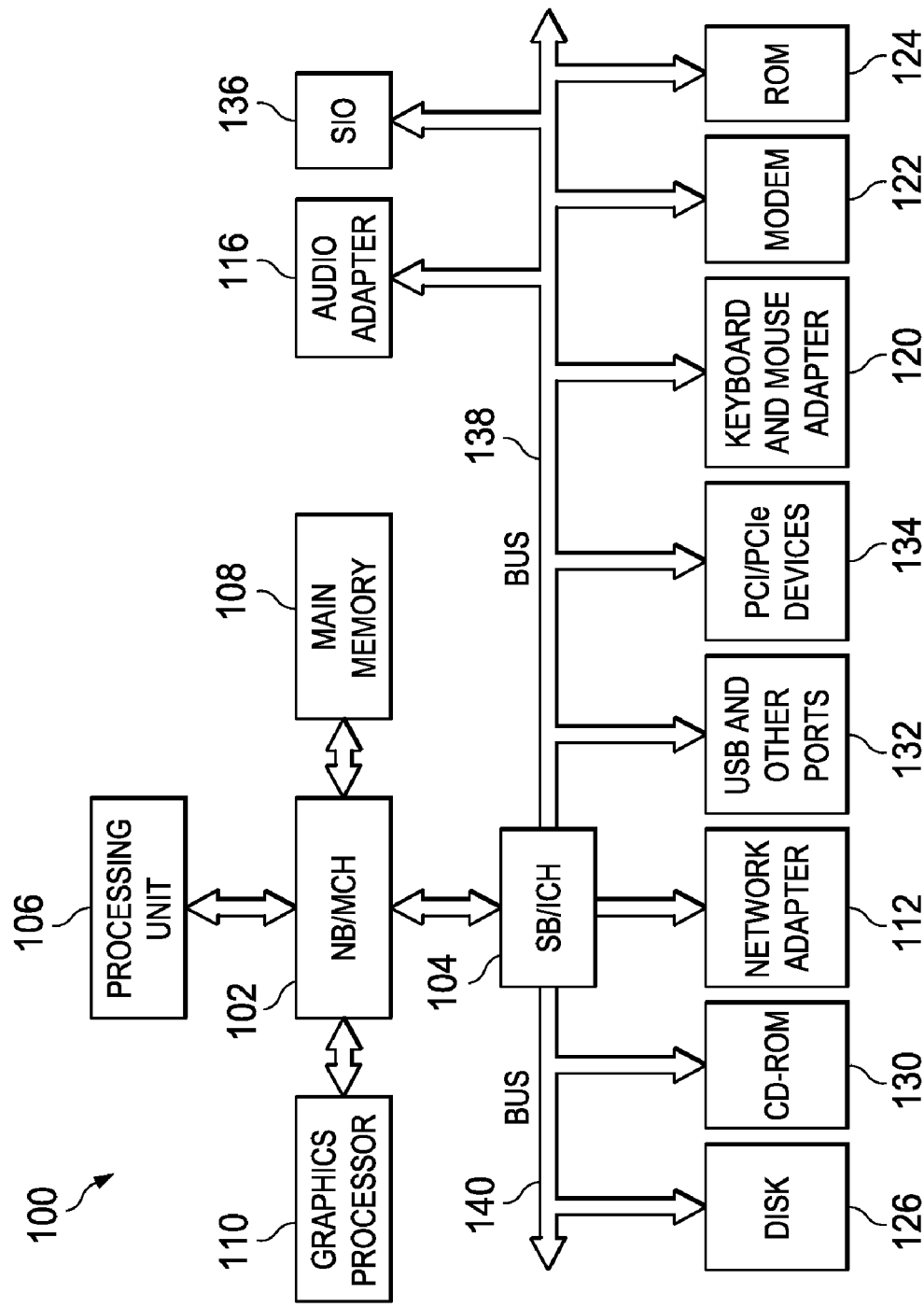
FIG. 1 is an exemplary block diagram of a data processing system in which exemplary aspects of the illustrative embodiments may be implemented.

Appendix A provides a specification for a quad-processing unit (QPU) in accordance with one illustrative embodiment.

DETAILED DESCRIPTION OF THE INVENTION

The illustrative embodiments provide mechanisms for dynamic data-driven alignment and data formatting in a floating-point SIMD architecture, including aligning enhanced precision vectors based on reduced precision data storage addresses. The mechanisms of the illustrative embodiments provide a floating point (FP) only single instruction multiple data (SIMD) architecture that is capable of handling comparisons, Boolean operations, vector selection based on such comparisons and/or Boolean operations, dynamic data-driven alignment, and flexible data rearrangement. The mechanisms of the illustrative embodiments provide such capabilities to a compiler having an optimizer and code generator adapted to use these capabilities. Moreover, the mechanisms of the illustrative embodiments further handle different floating point formats with efficient encoding and detection of alignment control words.

The illustrative embodiments provide a data representation for floating point only data parallel SIMD architectures that does not require support for integer encoding for the storage of comparison results, Boolean operations, selection operations, and data alignment. More specifically, there is provided a capability, for each target vector element slot, to store Boolean information and vector data reorganization control word information as floating point data. In accordance with the present invention, we define a floating point SIMD ISA (FP SIMD ISA) to be an instruction set to be an instruction set capable of processing floating point numbers in a SIMD arrangement from a dedicated floating point vector register file. An FP SIMD ISA will have arithmetic operational capabilities using operands in a floating point vector register file, i.e., two input arithmetic operations such as including, but not limited to, addition, subtraction, multiplication, and division, targeting exclusively floating-point data types, and optionally including, but not limited to, floating point arithmetic instructions with at least two operands from the floating point vector register file, and corresponding to either floating point vector operations or optionally floating point scalar instructions. An FP SIMD ISA may further include conversion instructions which convert floating point numbers to integers, or integers to floating point numbers (but not arithmetic on integer value inputs and producing integer value outputs) wherein said input and output values are contained in the floating point register file. An FP SIMD ISA may further contain memory load instructions loading into floating point vector registers and store instructions storing from floating point vector registers capable of computing memory addresses by adding address values and offsets, preferably contained in integer or general purpose registers, for the purpose of generating memory addresses used in accessing memory. An FP SIMD ISA may further include instructions to transfer from or into floating point vector registers. An FP SIMD ISA may further include instructions to read, write or otherwise manipulate floating point status registers. An FP SIMD ISA may further have support for executing other instructions connected to other register files.

In addition, the mechanisms of the illustrative embodiments provide the capability to process floating point data of different precision in a vector in a manner facilitating efficient implementation such that the number of lower precision computations is matched to the number of higher precision computations to reduce resource usage. More specifically, the mechanisms of the illustrative embodiments provide the capability, for each target vector element slot of a higher precision value, to load and store a lower precision element with a single vector instruction. These and other features and advantages will be described in greater detail hereafter with reference to the drawings and the exemplary illustrative embodiments they depict.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable mariner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to FIG. 1, an exemplary data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 204. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® EServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 206. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

With the data processing system 100 of FIG. 1, the processor 106 may have facilities for processing both integer (scalar) and floating point (vector) instructions and operating on both types of data. However, in accordance with the illustrative embodiments, the processor 106 may have hardware facilities for handling SIMD instructions and data as floating point only SIMD instructions and data. The scalar facilities are used for integer processing, and in conjunction with the floating point only SIMD architecture for inter alia loop control and memory access control.

Figure 2:
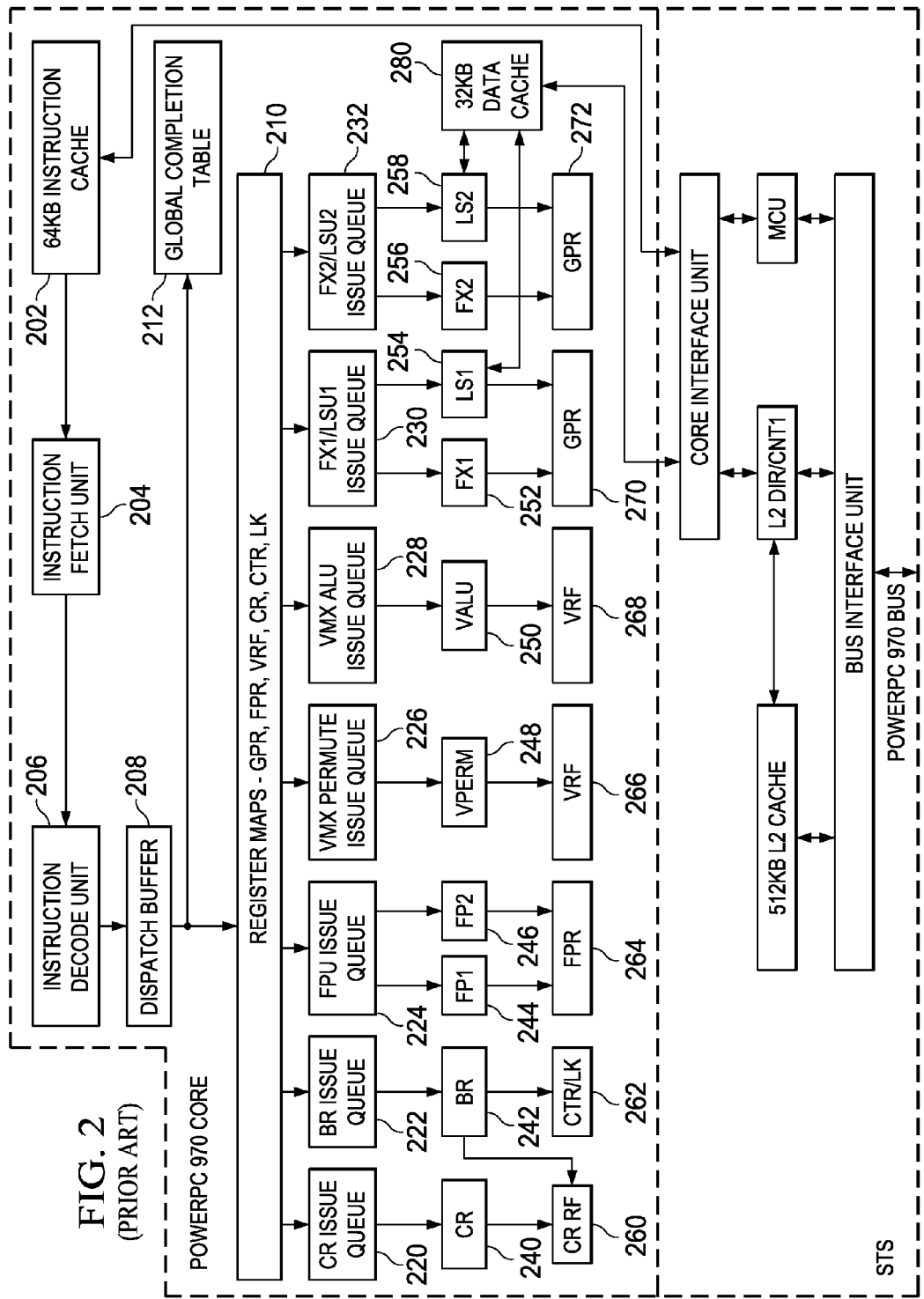
FIG. 2 is a block diagram of a known processor architecture shown for purposes of discussion of the improvements made by the floating point only single instruction multiple data (SIMD) instruction set architecture (ISA) of the illustrative embodiments.

FIG. 2 is a block diagram of a known processor architecture shown for purposes of discussion of the improvements made by the floating point only single instruction multiple data (SIMD) instruction set architecture (ISA) of the illustrative embodiments. The particular processor architecture shown in FIG. 2 is for the PowerPC™ 970 microprocessors available from International Business Machines Corporation of Armonk, N.Y. and described in the Redbook by Gibbs et al. entitled "IBM eServer BladeCenter JS20 PowerPC 970 Programming Environment," January 2005 (available at www.redbooks.ibm.com/redpapers/pdfs/redp3890.pdf).

As shown in FIG. 2, the processor architecture includes an instruction cache 202, an instruction fetch unit 204, an instruction decode unit 206, and a dispatch buffer 208. Instructions are fetched by the instruction fetch unit 204 from the instruction cache 202 and provided to the instruction decode unit 206. The instruction decode unit 206 decodes the instruction and provides the decoded instruction to the dispatch buffer 208. The output of the decode unit 206 is provided to both the register maps 210 and the global completion table 212. The register maps 210 map to one or more of the general purpose registers (GPRs), floating point registers (FPRs), vector register files (VRF), and the like. The instructions are then provided to an appropriate one of the issues queues 220-232 depending upon the instruction type as determined through the decoding and mapping of the instruction decode unit 206 and register maps 210. The issue queues 220-232 provide inputs to various ones of execution units 240-258. The outputs of the execution units 240-258 go to various ones of the register files 260-272. Data for use with the instructions may be obtained via the data cache 280.

Of particular note, it can be seen in the depicted architecture that there are separate issue queues and execution units for floating point, vector, and fixed point, or integer, instructions in the processor. As shown, there is a single floating point unit (FPU) issue queue 224 that has two output ports to two floating point execution units 244-246 which in turn have output ports to a floating point register file 264. A single vector permute issue queue 226 has a single output port to a vector permute execution unit 248 which in turn has a port for accessing a vector register file (VRF) 266. The vector arithmetic logic unit (ALU) issue queue 228 has one issue port for issuing instructions to the vector ALU 250 which has a port for accessing the vector register file 268. It should be appreciated that these issue queues, execution units, and register files all take up resources, area, and power.

Figure 3:
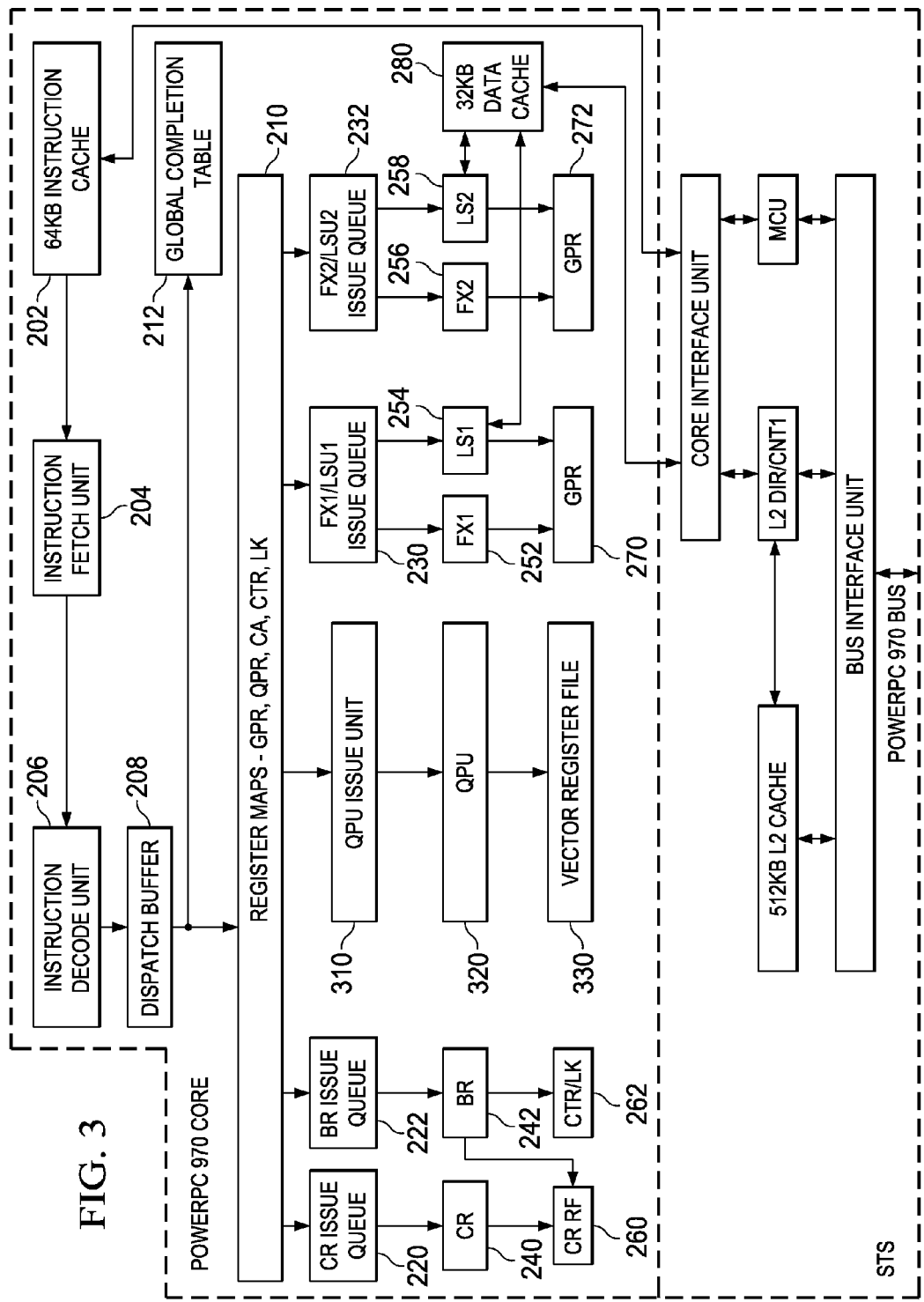
FIG. 3 is an exemplary diagram of a modified form of the processor architecture shown in FIG. 2 in which exemplary aspects of the illustrative embodiments may be implemented.

With the illustrative embodiments, in providing mechanisms for a floating-point only SIMD architecture, these issue units 224-228, the execution units 244-250, and register files 264-268 are replaced with a single issue queue, execution unit, and register file. FIG. 3 is an exemplary diagram showing the alternative processor architecture in accordance with one illustrative embodiment. The processor architecture shown in FIG. 3 is of a modified form of the PowerPC™ 970 architecture shown in FIG. 2 and thus, similar elements to that of FIG. 2 are shown with similar reference numbers. It should be appreciated that the example modified architecture is only an example and similar modifications can be made to other processor architectures to reduce the number of issue units, execution units, and register files implemented in these other architectures. Thus, the mechanisms of the illustrative embodiments are not limited to implementation in a modified form of the PowerPC™ 970 architecture.

As shown in FIG. 3, the modified architecture shown in FIG. 3 replaces the issue units 224-228 with a single quad-processing execution unit (QPU) issue unit 310. Moreover, the execution units 244-250 are replaced with the single quad-processing execution unit (QPU) 320. Furthermore, the register files 264-268 are replaced with a single quad-vector register file (QRF) 330. Because the quad-processing unit (QPU) can execute up to 4 data elements concurrently with a single instruction, this modified architecture not only reduces the resource usage, area usage, and power usage, while simplifying the design of the processor, but the modified architecture also increases performance of the processor.

It should be noted that the modified processor architecture in FIG. 3 still has the fixed point units (FXUs) which process scalar integers. Such scalar integers are used primarily for control operations, such as loop iterations, and the like. All other instructions are of the floating-point or vector format. Specifically, unlike the mixed floating point and integer execution repertoire of the VMX instruction set, the QPX instructions generally operate, and in particular perform arithmetic operations, on floating point data only. The only storage of integer-typed data is associated with conversion of data to an integer format for the purpose of loading and storing such integers, or moving a control word to and from the floating point status and control register (FPSCR). Reducing operations to a floating point-only format greatly enhances efficiency of floating point processing, as an appropriate internal representation optimized for the representation and processing of floating numbers can be chosen without regard to the needs of integer arithmetic, logical operations, and other such operations.

In accordance with one illustrative embodiment, with the floating-point only SIMD ISA, there is no requirement to support integer encoding for the storage of comparison results, Boolean operations, selection operations, and data alignment as is required in prior known ISAs. The floating-point (FP) only SIMD ISA allows substantially all of the data to be stored as floating point data. Thus, there is only one type of data stored in the vector register file 330 in FIG. 3.

In accordance with an illustrative embodiment, the FP only SIMD ISA provides the capability to compare floating point vectors and store comparison results in a floating point vector register of the vector register file 330. Moreover, the FP only SIMD ISA provides an encoding scheme for selection operations and Boolean operations that allows the selection operations and Boolean logic operations to be performed using floating point data representations.

In one illustrative embodiment, the FP only SIMD ISA uses an FP only double precision SIMD vector with four elements, i.e., a quad-vector for quad-execution by the QPU 320. Single precision SIMD vectors are converted automatically to and from double precision during load and store operations. While a double precision vector SIMD implementation will be described herein, the illustrative embodiments are not limited to such and other precisions including, but not limited to, single precision, extended precision, triple precision, and even decimal floating point only SIMD, may be utilized without departing from the spirit and scope of the illustrative embodiments.

In one illustrative embodiment, the mechanisms of the illustrative embodiment for implementing the FP only SIMD ISA are provided primarily as logic elements in the QPU 320. Additional logic may be provided in one or more of the memory units LS1 and LS2 as appropriate. In other illustrative embodiments, the mechanisms of the illustrative embodiments may be implemented as logic in other elements of the modified architecture shown in FIG. 3, such as distributed amongst a plurality of the elements shown in FIG. 3, or in one or more dedicated logic elements coupled to one or more elements shown in FIG. 3. In order to provide one example of the implementation of the illustrative embodiments, it will be assumed for purposes of this description that the mechanisms of the illustrative embodiments are implemented as logic in the QPU 320 unless otherwise indicated. For a more detailed explanation of one illustrative embodiment of the logic in the QPU 320, reference should be made to Appendix A which provides a specification for the QPU 320 architecture.

As part of the FP only SIMD ISA of the illustrative embodiments, capability is provided to compare FP vectors and store comparison results in the FP vector register file 330. Comparison choices are encoded using FP values corresponding to Boolean values. For example, in one illustrative embodiment, for a "TRUE" output, i.e., the conditions of the comparison are met and a "TRUE" result is generated, the output is represented as an FP value of 1.0. For a "FALSE" output, i.e. the conditions of the comparison are not met and a "FALSE" output is generated, the output is represented as an FP value of −1.0. Functions that generate such FP values based on whether or not conditions of a comparison are met or not include the QVFCMPEQ function which compares two FP values to determine if they are equal, the QVFCMPGT function which compares two FP values to determine if a first FP value is greater than a second FP value, and the QVFCMPLT function which compares two FP values to determine if the first FP value is less than the second FP value. In addition, a test function, i.e. QVTSTNAN, is provided for testing for a "Not a Number" (NaN) condition. The output of these functions is either 1.0 for TRUE or −1.0 for FALSE.

In addition to these comparison functions, a matching select functionality is provided in the FP only SIMD ISA of the illustrative embodiments. This quad-vector floating point select, or QVFSEL, function has the format qvfsel QRT, QRA, QRC, QRB. With this quad-vector floating point select function, the floating-point operand in each doubleword slot of register QRA is compared to the value zero to determine a value of TRUE or FALSE. If the operand is greater than or equal to zero (i.e., is TRUE), the corresponding slot of register QRT is set to the contents of register QRC. If the operand is less than zero or is a NaN, register QRT is set to the contents of register QRB. The comparison ignores the sign of zero, i.e., it regards +0.0 as equal to −0.0. Thus, any positive comparison result of this matching select function causes the floating point SIMD vector element of the QRT register to take the corresponding floating point SIMD vector element of the QRC register. Otherwise, any negative or Nan value will cause the floating point SIMD vector element of the QRT register to take the values of the corresponding floating point SIMD vector element in the QRB register.

In accordance with one illustrative embodiment, distinct definitions of TRUE and FALSE are used as input and output representations, wherein the output representation (i.e., the value generated to represent TRUE or FALSE as the result of a computation) are a subset of the range of TRUE and FALSE values used as the input representation. Specifically, the representations shown in Table 1 are used:

TABLE 1

| Input/Output Representations | | |
|---|---|---|
| | TRUE | FALSE |
| Output representation | +1.0 | −1.0 |
| Input representation | ≧±0.0 | <±0.0 or NaN |

In accordance with one aspect of one illustrative embodiment, this choice of input/output representations eliminates undefined behavior. In accordance with another aspect of one illustrative embodiment, this choice also offers compatibility of a "select" function with a legacy "select" function based on floating point sign in accordance with at least one legacy instruction set that does not offer the capability to store Boolean values encoded as floating point numbers and perform comparisons and Boolean operations. In accordance with yet another aspect of one illustrative embodiment, this choice simplifies decoding of Boolean values when used as input to instructions reading Boolean input operands.

Moreover, with the FP only SIMD ISA of the illustrative embodiments, quad-vector floating point logical functions are also defined such that vector outputs are generated. For example, logical functions for AND, OR, XOR, NAND, etc. operations are defined in terms of FP only SIMD ISA Boolean values, e.g., 1.0 for TRUE and −1.0 for FALSE. For example, an AND operation is defined by the FP only SIMD ISA such that 1.0 AND 1.0 results in an output of 1.0, otherwise the output of AND with at least one negative operand is −1.0.

Generally, the operation of an exemplary FP Boolean AND for each vector position of the SIMD vector in accordance with one embodiment of the present invention can be described as per Table 2.

TABLE 2

| Exemplary embodiment for FP Boolean AND function | | |
|---|---|---|
| | input 2 | |
| input 1 | ≧±0.0 | <±0.0 or NaN |
| ≧±0.0 | +1.0 | −1.0 |
| <±0.0 or NaN | −1.0 | −1.0 |

Similarly, for an OR operation, the FP only SIMD ISA defines 1.0 OR 1.0, −1.0 OR 1.0 and 1.0 OR −1.0 such that it results in an output of 1.0, and −1.0 OR −1.0 giving an output of −1.0.

Generally, the operation of an exemplary FP Boolean OR for each vector position of the SIMD vector in accordance with one embodiment of the present invention can be described as per table 3.

TABLE 3

| Exemplary embodiment of FP Boolean OR function | | |
|---|---|---|
| | input 2 | |
| input 1 | ≧±0.0 | <±0.0 or NaN |
| ≧±0.0 | +1.0 | +1.0 |
| <±0.0 or NaN | +1.0 | −1.0 |

Those skilled in the art will similarly be able to define other Boolean functions based on a defined set of input and output representations of the values of TRUE and FALSE in accordance with the teachings contained hereinabove and in the scope of the present invention.

In accordance with one exemplary embodiment of this invention, a "flogical" instruction is provided. The "flogical" instruction encodes a "truth table" using 4 bits (i.e., an encoding of an arbitrary Boolean logic function with up to 2 inputs), whereby two Boolean operands, encoded as floating point values, are used to index into this table and obtain a Boolean result. The Boolean result is then encoded as an floating point (FP) Boolean value in accordance with the mechanisms of the illustrative embodiments and stored in the register file. In the context of a SIMD vector architecture, the "flogical" instruction is a vector "qvflogical" instruction. In such a case, the Boolean values in each slot are independently used to independently derive an output result, encoded as FP Boolean, for each vector position.

Figure 4:
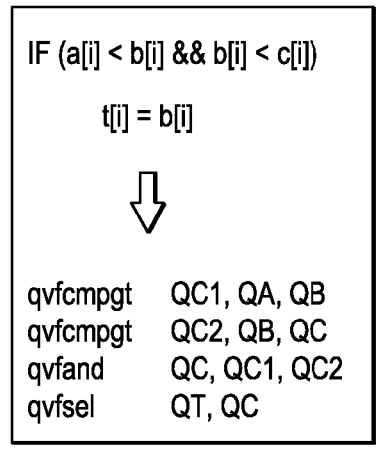
FIG. 4 is an example of code for implementing a complex evaluation using the mechanisms of the FP only SIMD ISA of the illustrative embodiments.

With the above mechanisms of the FP only SIMD ISA of the illustrative embodiments, complex evaluations may be made. FIG. 4 is an example of code for implementing a complex evaluation using the mechanisms of the FP only SIMD ISA of the illustrative embodiments. With the example shown in FIG. 4, Boolean values are generated in a vector representation and Boolean logic operations are performed on such vectors with vector Boolean values being output. Moreover, vector select operations are provided for implementing data selection on such vectors.

As shown in FIG. 4, in the example, a first value a[i] is compared to a second value b[i] to determine if a[i] is less than b[i]. The second value b[i] is further compared to a third value c[i] to determine if b[i] is less than c[i]. If both conditions are satisfied, then t[i] is set equal to b[i]. FIG. 4 shows how this functionality may be implemented using the compare, Boolean logic, and select instructions of the FP only SIMD ISA.

As shown in FIG. 4, four floating point only SIMD instructions are used to perform the comparison, logic, and selection operations of the example. A first instruction is the quad vector floating point compare for greater than instruction QVFCMPGT which takes the quad-vector register values from quad-vector register QA and the quad-vector register values from quad-vector register QB and determines for each of the four vector elements in a quad vector register if the value from QA is larger than the value from QB and stores the result in the four corresponding vector elements in QC1. If the comparison results in a "true" result, i.e., a value in a position of QA is greater than the corresponding value in the corresponding vector position of QB, then a value of 1.0 is stored in QC1 for that corresponding position. If the comparison results in a "false" result, i.e., a value in a position of QA is not greater than the corresponding value in the corresponding vector position of QB, then a value of −1.0 is stored in QC1 for that corresponding position. A similar comparison is performed with the vector values from QB and QC with the result being stored in QC2. A quad-vector logic AND function, QVFAND, is performed on the values in QC1 and QC2 with the result being stored in register QC. A quad-vector select function, QVFSEL, is performed to select for each vector position a value for input to quad-vector register QT based on the value stored in the quad-vector register QC.

Thus, with the floating point only SIMD ISA of the illustrative embodiments, the floating point vector compare instructions may be used to compute conditions for data-parallel select operations. The data parallel select instructions may be used to optimize and SIMD vectorize code with conditional execution. The data parallel select instructions support data-parallel if conversion and data parallel select operations. The floating point logical instructions may be used to compute even more complex expressions for the data-parallel select instructions.

It should be noted that in prior SIMD ISAs it was not possible to perform vector floating point compare and selection operations such as that shown in FIG. 4 because both encoding of Boolean values in floating point ISAs and the necessary operational support for using such encodings has previously eluded those skilled in the art. In the known ISAs these instructions are implemented as integer operations because encoding of Boolean values in FP has previously eluded those skilled in the art. Thus, in order for such instructions to operate on floating point values and vectors of floating point values, such vector values have previously been required to either be converted to scalar instructions, and scalar comparisons into condition codes (which represent conditions as single or multi-bit integers) or vectors of integer values.

When conversion to scalar values has been used, the scalar instructions must be executed on the converted scalar values, and the result converted back to a vector value, resulting in significant processing inefficiency. When integer vectors have been used, expensive support for vector processing with both floating point and integer values has been required.

Figure 5:
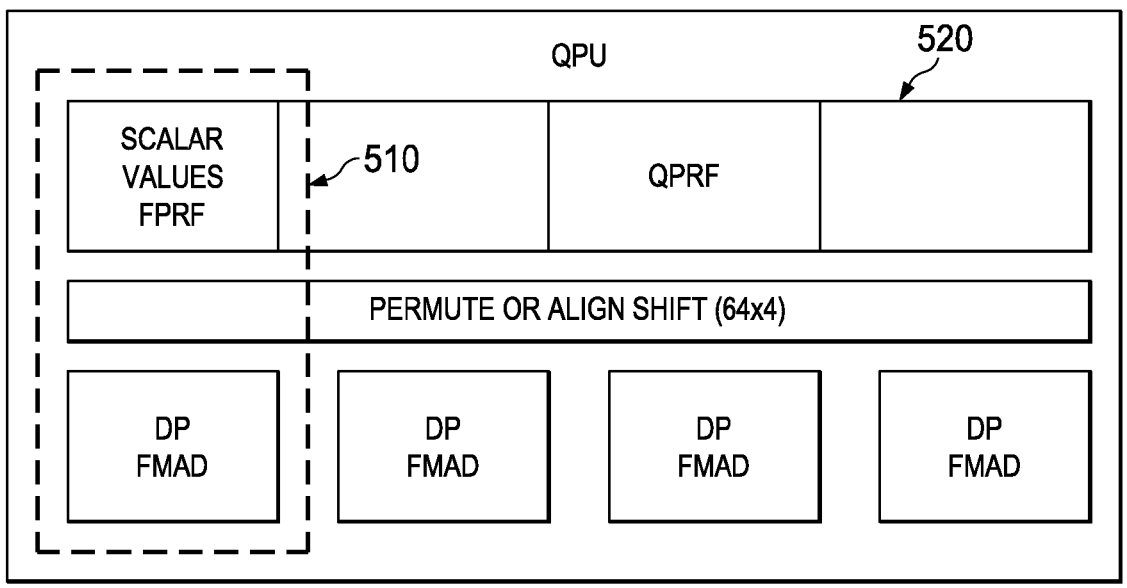
FIG. 5 is an exemplary diagram illustrating a legacy scalar ISA that is overlaid on the floating point only vector SIMD ISA of the illustrative embodiments such that legacy instructions may be executed using the vector registers of the illustrative embodiments.

As discussed above, in the illustrative embodiments, a quad-processing architecture is utilized in which a quad-processing unit (QPU) can execute up to 4 data elements concurrently with a single instruction. This quad-processing architecture is referred to as the Quad-Processing eXtension architecture (QPX). In one illustrative embodiment, the QPX architecture utilizes a four data element double precision SIMD architecture which is fully compliant with the PowerPC scalar computation architecture. That is, as shown in FIG. 5, a legacy scalar ISA is overlaid on the floating point vector SIMD ISA of the illustrative embodiments such that legacy instructions may be executed using the vector registers of the illustrative embodiments. Legacy scalar instructions operate on a preferred slot 510, i.e., a well defined element position in the vector of the vector registers 520. For such scalar instructions, and data values, the other slots of the vector may be set to zero, left undefined, set to another well defined value, or the like. These are basically "don't care" slots with regard to the scalar instructions.

By establishing a preferred slot 510 for scalar instructions, data sharing between scalar and vector instructions is obtained. Thus, there is no need for conversion operations for converting between scalar and vector data values as with known ISAs. Moreover, both scalar and floating point vector instructions and values may be stored in the same vector register file, e.g., vector register file 330 in FIG. 3. This eliminates the need for a separate scalar floating point unit and vector floating point unit while still allowing scalar instructions to be executed.

Figure 6:
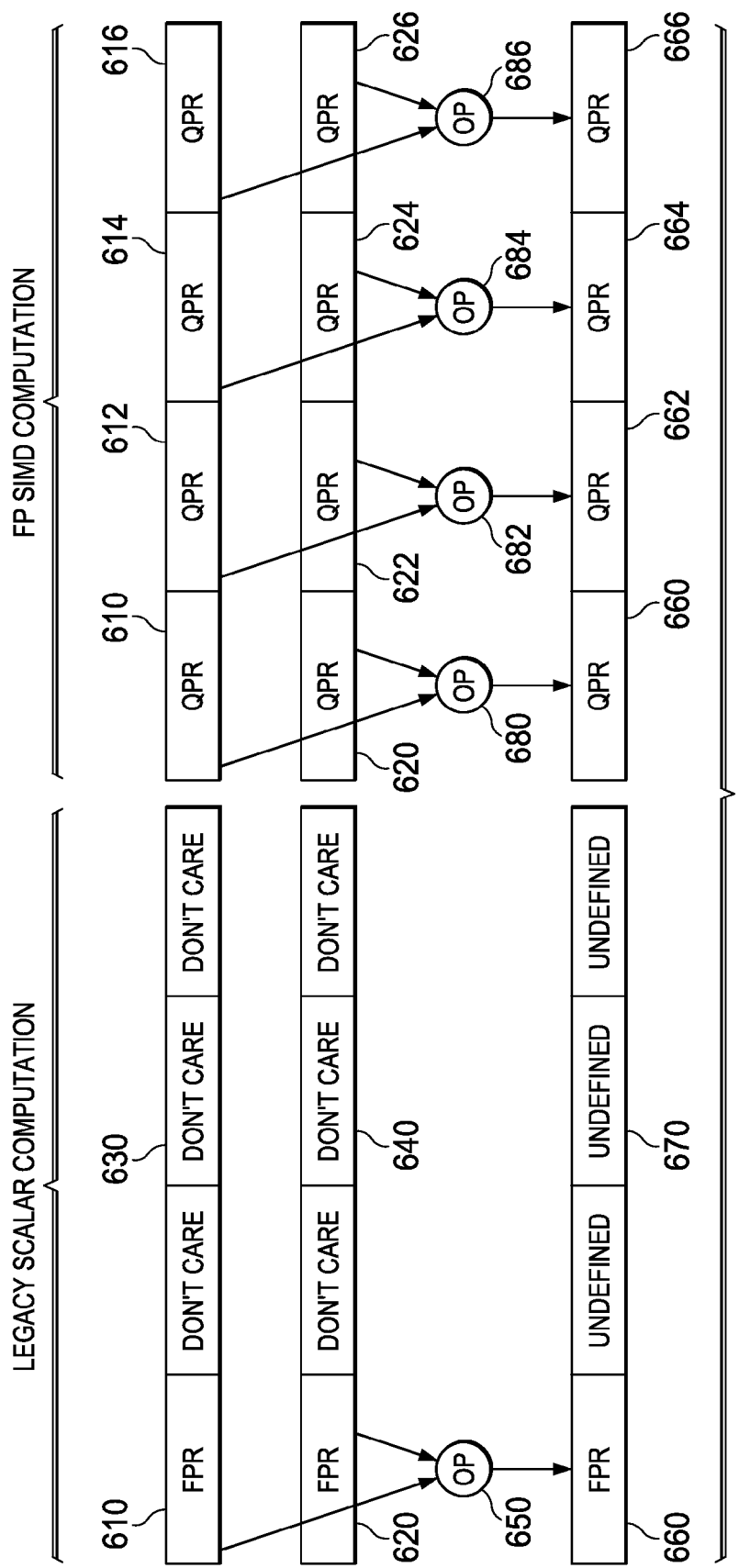
FIG. 6 is an exemplary diagram illustrating how the same vector registers may be used to perform legacy scalar computation operations as well as vector computation operations.

FIG. 6 shows how the same vector registers may be used to perform legacy scalar computation operations as well as vector computation operations. As shown in FIG. 6, for scalar computation operations, the preferred slots 610 and 620 of the vector registers 630 and 640 in the vector register file, e.g., vector register file 330, are operated upon by the scalar instruction or operation 650 with the scalar result being stored in the preferred slot 660 of vector register 670. The other slots 612-616 and 622-626 of the vector registers 630 and 640 are "don't care" slots and are not used by the scalar instruction. As mentioned above, these slots may have values that are set to zero, some well defined value, the value in slots 610 and 620 may be replicated to the remaining slots in their corresponding register, or the like.

With floating point vector instructions, instructions are able to perform four operations 680-686 on respective ones of the slots 610-616 and 620-626 of the vector registers 630 and 640. The results of these vector instructions 680-686 are written to corresponding slots 660-666 of the vector register 670. Thus, both scalar instructions and vector instructions may be executed by a quad-processing unit (QPU), such as QPU 320 in FIG. 3, using the vector registers of the vector register file 330, for example. This greatly reduces the area, power, and resource consumption of the processor architecture.

In addition to the floating point Boolean instructions, logic instructions, select instruction, and comparison instructions, the floating point only SIMD ISA of the illustrative embodiments further provides a permute functionality on the quad-processing vector register data values. The permute function or operation is performed at the vector element granularity on naturally aligned vector elements. The permute functionality in the QPU 320 is implemented in such a way as to support an all-to-all permutation. That is, any of the elements of two input vector registers may be selected for storage in any of the first through fourth elements of a result vector register. The selection of which vector register element is to be used for each slot of the result vector register is controlled by a control value which is also a floating point vector value.

Figure 7:
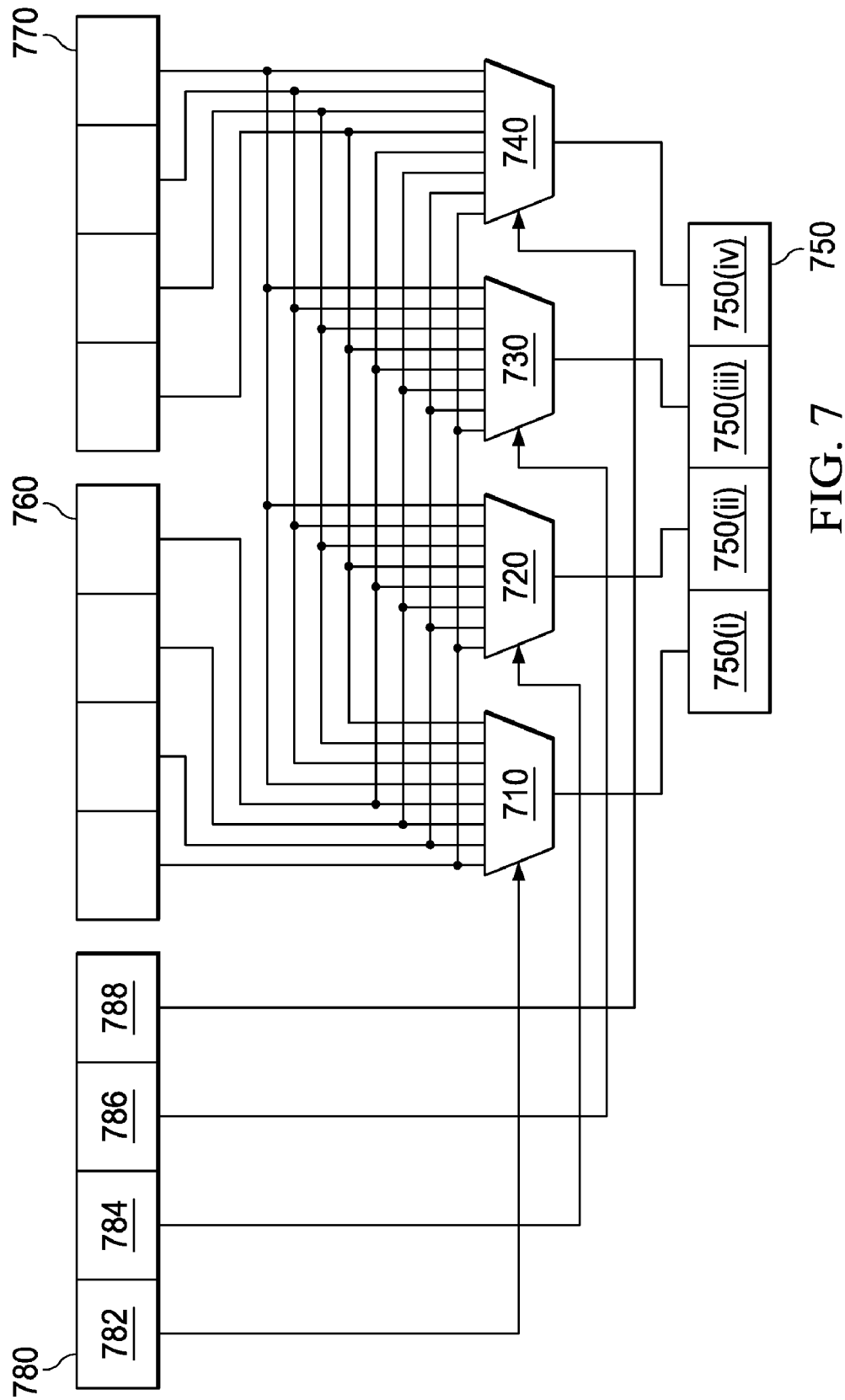
FIG. 7 is an exemplary diagram of the permutation logic for a quad-processing unit in accordance with one illustrative embodiment.

FIG. 7 is an exemplary diagram of the permutation logic for a quad-processing unit in accordance with one illustrative embodiment. As shown in FIG. 7, four multiplexers 710-740 are provided. Each multiplexer 710-740 outputs one of the input vector register elements as an output to a corresponding one of the vector elements in result vector register 750. In the depicted embodiment, each multiplexer 710-740 has eight inputs, one from each of the four elements of the vector registers 760 and 770. A third vector register 780 provides the control input to the multiplexers 710-740. That is, each element 782-788 is input to a respective one of the multiplexer 710-740 and identifies which input to output to the result vector register 750. The third vector register 780, is also part of the vector register file along with vector registers 760 and 770 and thus, has a similar configuration as described herein.

Thus, with the permutation logic of FIG. 7, the permute instruction of the floating point only SIMD ISA may select from two source vectors, any of the elements to generate one target vector. Operations are provided for constructing a control vector and storing that control vector in a vector register, such as vector register 780 in FIG. 7. In one illustrative embodiment, instructions for performing such operations are adapted to construct the control vector as a floating point vector from a literal, i.e. an immediate value field in the instruction word (e.g., see qvgpci instruction in FIG. 12, described hereafter), encoded in the instruction word. In another illustrative embodiment, instructions are adapted to construct the control vector as a floating point vector from an address specified as an operand to the instruction (for example, see the qvlpcldx and qvlpclsx instructions of FIGS. 9 and 10 which read registers ra and rb and convert them into control words stored in the qalign register, described hereafter).

The control vector indicates a permutation pattern as a floating point vector. When at least one slot of the control vector is being write-updated, all elements of the vector are write-updated to a determined or indeterminate value, as previously described above with regard to FIG. 6, for example. For example, the instructions qvgpci of FIG. 12, qvlpcldx of FIG. 10, qvlpclsx of FIG. 9, as well as the qvlperdx and qvlpersx instructions which are demonstrated in the appendix of the instruction set, are exemplary instructions for generating these control vectors.

Thus, a FP-only SIMD ISA processor, data processing system, apparatus or the like, such as that described in the illustrative embodiments herein, comprises at least a floating point vector register file containing at least two floating point vector register elements in a single floating point vector register and a permute unit receiving at least two input operands containing data to be permuted and at least one control vector indicating the permutation pattern as a floating point vector. The permute functionality of the permute unit supports an all-to-all permutation in which any of the floating point vector register elements of the two input floating point vector registers may be selected for storing in any floating point vector register element of a result floating point vector register. Selection of which floating point vector register element of the result floating point vector register is to be used is controlled by a floating point vector control value of the control vector. The floating point vector control values of the control vector specify a permutation pattern. The permutation pattern is, in one illustrative embodiment, a floating point vector encoded by way of high-order mantissa bits and a well-defined exponent value, as described hereafter.

In one illustrative embodiment, the floating point representation of the floating point vector values for the permute control vector is chosen to correspond to numbers having only a single possible representation. In another illustrative embodiment, the floating point representation of the floating point vector values for the permute control vector is chosen to correspond to numbers not requiring preprocessing to determine the control action of the permute unit. The permute instruction, that invokes the operation of the permute unit, is adapted to permute single and double precision values stored in the respective one of each vector locations directly.

Figure 10:
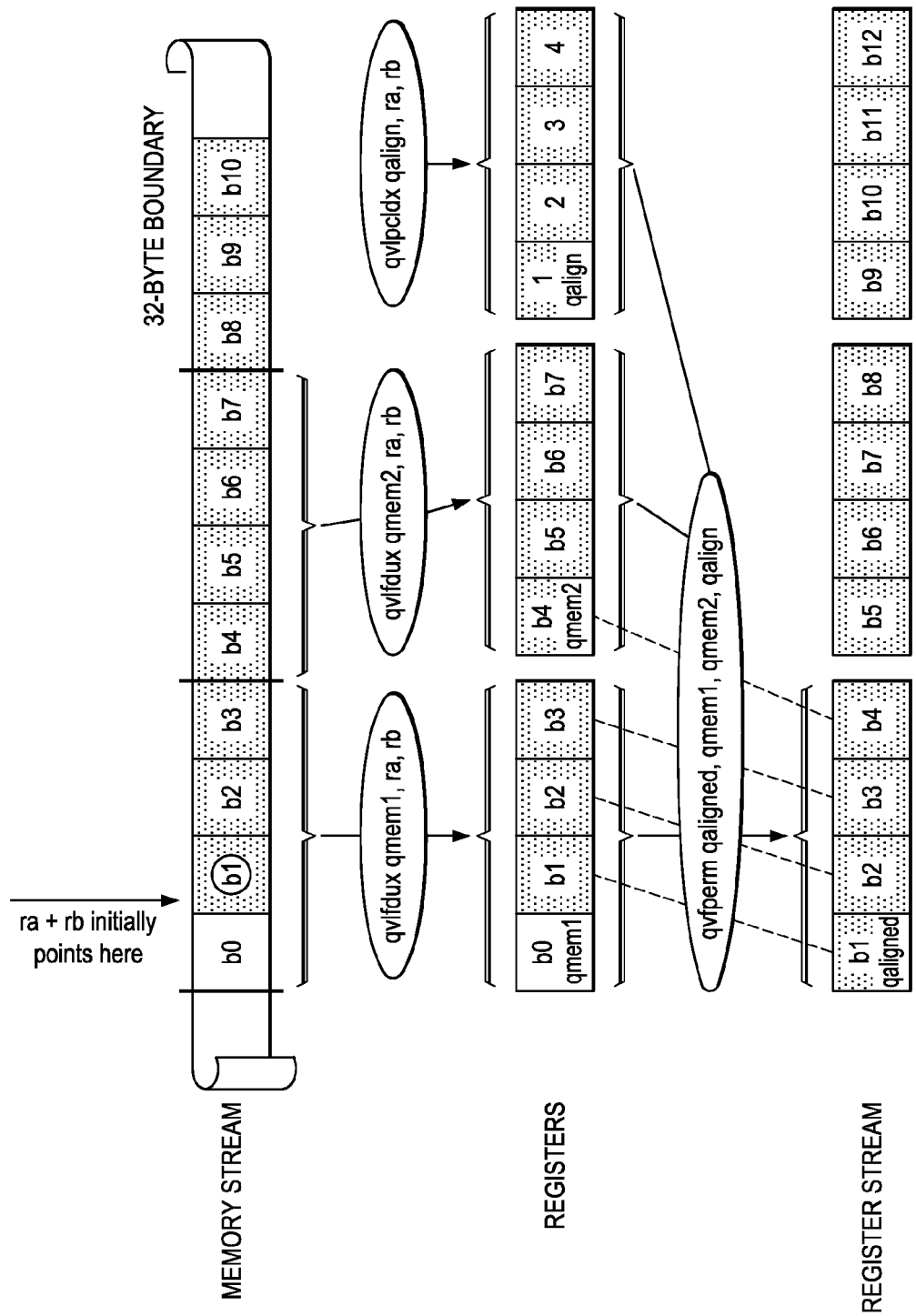
FIG. 10 is an exemplary diagram illustrating the data alignment performed for double precision data values in accordance with one illustrative embodiment.
Figure 11:
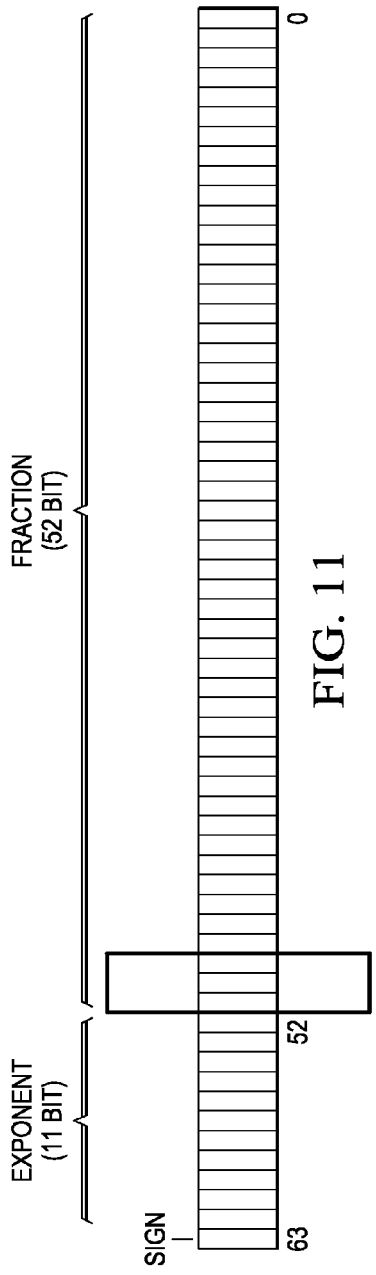
FIG. 11 is an exemplary diagram illustrating the encoding of alignment data in the most significant bits of a mantissa of a floating point number in accordance with one illustrative embodiment.

The logic of the permute unit, as shown in the illustrative embodiment of FIG. 7, comprises one or more multiplexers, e.g., four multiplexers in the depicted example, each of the one or more multiplexers outputting a floating point value selected from floating point values of the at least two floating point vector register elements, as an output to a corresponding one of the floating point vector register elements in the result floating point vector register. The floating point vector register elements may represent input operands for example. The vector elements of the control vector indicate the permutation pattern as a floating point vector that encodes the source of the floating point number. For example, with regard to the example of FIG. 7, the control vector 780, and more specifically its specific elements 782, 784, 786, and 788, encode the source information for each of the elements 750(*i*), 750(*ii*), 750(*iii*), and 750(*iv*). Element 780 (and specifically the slots 782, 784, 786 and 788) of FIG. 7 represent an alignment control vector that, as a software register, is specified by the register name qalign with respect to FIGS. 9 and 10 hereafter. As such, 780 is the apparatus aspect implementing qalign. Register 780 (register qalign) consists of 4 vector element slots each encoded in accordance with FIG. 11, described hereafter, wherein each vector slot encodes the source to be selected by multiplexors 710 thru 740 in accordance with FIG. 7. As described hereafter, FIG. 11 shows 3 bits of the fraction being used, which allows the multiplexers to select $2^3=8$ possible inputs. Those skilled in the art will understand that the illustrative embodiments may be applied to vectors of other lengths, e.g., of length 2 wherein 2 selection bits suffice, or of length 8, wherein 4 selection bits to select from 2 inputs, each of the 2 inputs having 8 elements, are utilized.

In one illustrative embodiment of a floating point SIMD architecture, the control word is encoded in a floating point format. In some illustrative embodiments, the floating point format used to encode alignment information uses a predefined exponent value and encodes the alignment information as part of the mantissa. In one of these illustrative embodiments, the alignment information is encoded in the high-order mantissa bits. Those skilled in the art will understand that other encodings can be used to describe alignment based on the teachings contained herein, including those that use one or more of exponent bits, sign bits and lower order mantissa bits.

A compiler for the FP only SIMD ISA of the illustrative embodiments may make use of these compare, Boolean, select, logic, and permute instructions when optimizing code for execution. For example, if original code has the "if" code shown in FIG. 4, the "if" code can be converted to the set of comparison and select instructions also shown in FIG. 4. The compiler may parse the original code and transform the code into a set of instructions corresponding to the floating point only SIMD ISA of the illustrative embodiments. Thus, the compiler may have code for identifying different code sequences corresponding to the particular instructions in the floating point only SIMD ISA.

In accordance with the present invention, the compiler may further have code to assign Boolean conditions to the novel floating point Boolean representation and a novel assignment algorithm to assign logical values to floating point registers by making use of the floating point Boolean representation. Furthermore, in some illustrative embodiments of the present invention, the compiler may furthermore have the capability to generate novel instructions operating on the novel floating point Boolean values, e.g., to evaluate Boolean operations. The compiler may furthermore have the ability to translate Boolean expressions into sequences of instructions including the instructions operating on floating point Boolean values, such as floating point Boolean logical operations and floating point Boolean select.

In accordance with the present invention, the compiler may furthermore have code to understand that data parallel if-conversion can be performed to target a floating point-only SIMD ISA, by translating if instructions into data parallel select, i.e., performing FP-oriented data-parallel if conversion. Moreover, the compiler may furthermore have code cognizant of that data reorganization and the ability to perform the data reorganization in an FP-only SIMD ISA. It may further be able to generate code to use the data reorganization to re-align vector values, by generating permute control words and generating floating-point oriented permute instructions for an FP-only SIMD ISA.

In accordance with the present invention, the compiler may furthermore have code cognizant of the requirement to widen vectors of single precision values to vectors of double precision values on load from memory when a vector of single precision values is to be loaded, and truncating double precision values in a vector of double precision values into single precision values in a vector of single precision values when a vector of single precision values is to be stored. With regard to some illustrative embodiments of the present invention, the compiler may further be cognizant that realignment control for vector realignment uses naturally aligned double word memory address boundaries (corresponding to double precision values stored in memory) for double precision vectors that have been loaded with instructions directed at loading vectors consisting of double precision values. The compiler may further be cognizant that realignment control for vector realignment must translate naturally aligned word memory address boundaries (corresponding to single precision values stored in memory) for single precision vectors that have been loaded with instructions directed at loading vectors consisting of single precision values and converting them to double precision values, in a manner preserving the positions within the vector regardless of data size by adjusting positions in accordance with the performed conversion from vectors consisting of single precision values to vectors consisting of double precision values.

Those skilled in the art will understand that similarly, in accordance with the present invention, the compiler will be cognizant of like issues when data is to be stored from the double precision vector register format into one of vectors of double precision and vectors of single precision, when conversion is to be performed, and when realignment for store is to be performed.

Figure 8A:
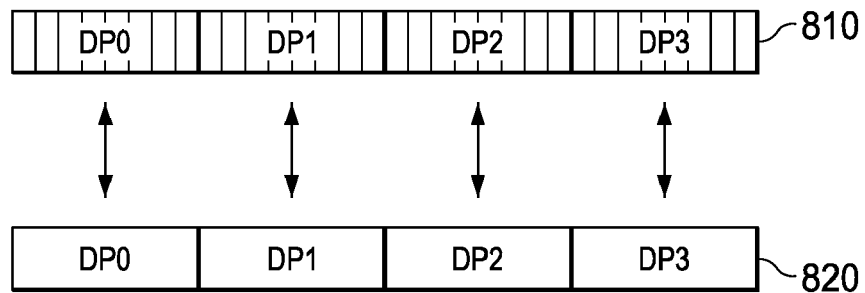
FIG. 8A is an exemplary diagram illustrating a double precision memory access in accordance with one illustrative embodiment.

As mentioned above with the illustrative embodiments, the values stored in the slots of the vector registers in the vector register file are preferably double precision floating point values. Thus, with the quad-processing architecture of the illustrative embodiments, four double precision floating point values may be stored in a single vector register of the vector register file. For example, as shown in FIG. 8A, four double precision floating point values DP0-DP3 are loaded from a 32 Byte block of memory 810 as a naturally aligned 32 Byte vector and placed into a 32 Byte vector register 820 of the vector register file.

Figure 8B:
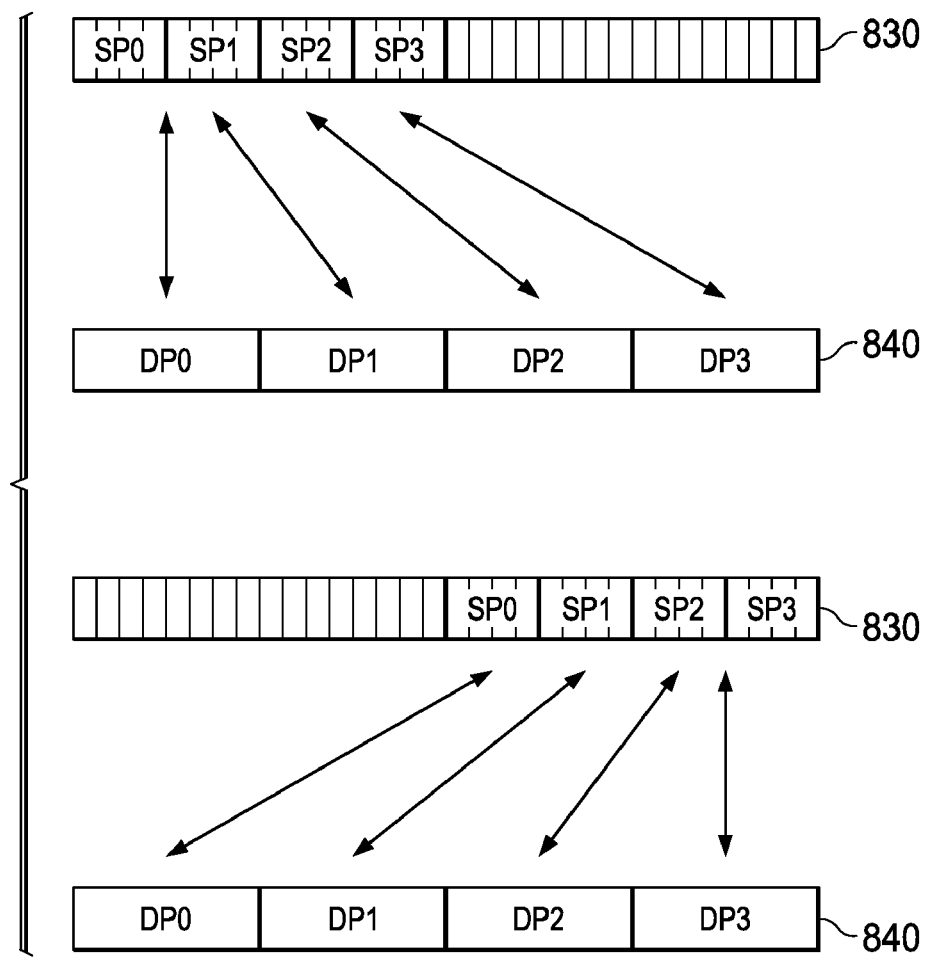
FIG. 8B is an exemplary diagram illustrating a single precision memory access in accordance with one illustrative embodiment.

The illustrative embodiments further provide mechanisms for handling single precision memory access as shown in FIG. 8B. With a single precision memory access, the first 16 byte block in a 32 byte block is loaded into a quad-processing vector register with precision expansion. As shown in FIG. 8B, four single precision floating point values SP0-SP3 are loaded from a 32 Byte block 830 as a naturally aligned 16 Byte vector, from either a first 16 byte aligned vector position or a second aligned 16 byte vector position, and placed into the 32 Byte register 840 after precision expansion, wherein the first or second block is preferably selected by one additional address bit being decoded by corresponding load instruction. The precision expansion may be performed implicitly by a load instruction that extends the values loaded from memory into elements of a vector.

Alternatively, the precision expansion may be performed by providing an additional extension instruction. In accordance with such an alternate illustrative embodiment, an extract single and convert to double instruction will select a 16 byte data range from a 32 byte vector register, interpret the 16 byte data range as a sequence of 4 single precision values, and convert each single precision value into a double precision value, generating a 32 byte vector consisting of 4 double precision values. In accordance with one illustrative embodiment, the first or second 16 byte subrange is specified by an operand and provides data-driven subrange selection and conversion. In accordance with an alternate illustrative embodiment, the subrange is encoded in the instruction, and one or multiple instructions corresponding to different subranges may be provided.

It should be appreciated that, conversely, when a value in a vector register is to be stored as a lower precision vector, the value is stored using a store instruction which reduces the precision. Those skilled in the art will be able to use a number of different methods in conjunction with the illustrative embodiments for reducing procession in order to convert a double precision number to a single procession number, including known and future precision reduction methods, such as the known methods of truncating, and specifically truncating in accordance with the Power Architecture™ specification, and rounding, either in accordance with a dynamically or statically specified rounding mode. Again, in an alternative embodiment, an additional instruction may be provided which may reduce the precision of the value prior to performing the store operation.

Thus, in the FP only SIMD ISA of the illustrative embodiments, a vector register of the vector register file may store either four single precision FP vector elements extended to double precision, or four double precision floating point vector elements. With the expansion mechanism of the illustrative embodiments, data is "stepped up" from an internal $k[i]$ bit representation ($i$ being the data type loaded) to a $k[j]$ ($j$ being the data type stored into the register) representation and an expansion factor $k[i]/k[j]$ takes place. This expansion, however, defeats known alignment operations which compute alignment based on the data address. Specifically, when alignment refers to a value of type $i$ with alignment $a*k[i]$, when data type $i$ is stepped up, it will now be at position $a*k[i]/(k[i]*k[j])=a*k[j]$ and hence alignment information referring to $a*k[i]$ will no longer refer to the original datum in its "stepped up" form, and thus lead to incorrect realignment of the stepped up data.

Typically, with known polymorphic architectures, such alignment of vectors is done using polymorphic byte-wise data rearrangement in which vector displacement is specified by a byte offset. However, with an architecture in which vector registers store wider elements, and narrow elements may be extended to these wider elements for processing, as in the floating point only SIMD ISA of the illustrative embodiments, it is not possible to perform such byte-wise data rearrangement. Depending on the architectures, there may be other causes for which it is not possible to perform such byte-wise data rearrangement.

For example, different vector data types may be realigned with correspondingly different vectors. This is necessary because an offset of 8 Bytes will indicate, for example, for a single precision vector a misalignment of 2 elements whereas for a double precision vector, a misalignment of a single element. While it may be possible to have different re-arrangement instructions for different vector data types, e.g., single precision versus double precision, this requires an increase in opcode usage (multiple instructions must be encoded), verification complexity (multiple instructions must be verified), and programming complexity (a programmer or compiler must understand what permute instruction to use for each register depending on how the vector was loaded regardless of its present data type).

The illustrative embodiments alleviate this additional complexity by providing a common data rearrangement capability for a double precision floating point only SIMD ISA. The common data rearrangement capability uses a first instruction for obtaining alignment information from the double precision floating point value in the vector register file and uses this information to compute an alignment mask that identifies how far away from an element boundary the data is. The data is loaded and then a permute operation is performed on the loaded data based upon the determined alignment mask.

In accordance with the illustrative embodiments, different mask generation instructions are provided corresponding to the loading of data types. In one embodiment, a first instruction computes an alignment mask (or alignment control word) corresponding to loading data without data step up. Yet another instruction computes an alignment mask (or alignment control word) corresponding to loading data with a defined step up factor, and considering that defined step up factor to step up alignment information. Those skilled in the art will understand how to add a second instruction with yet another step up (or step down) factor, a third instruction with yet a different step up/down factor, and so forth.

A set of instructions for performing common data rearrangement, regardless of the instruction having generated the alignment control word, is provided for single precision and for double precision floating point data values, in one illustrative embodiment. In accordance with one illustrative embodiment, an example sequence of instructions used to perform alignment of floating point data values for single precision data values is the following:

qvlpclsx qalign, ra, rb
qvlfsux qmem1, ra, rb
qvlfsux qmem2, ra, rb
qvfperm qaligned, qmem1, qmem2, qalign For double precision floating point data values, a similar example set of instructions are used to perform alignment:

qvlpcldx qalign, ra, rb
qvlfdux qmem1, ra, rb
qvlfdux qmem2, ra, rb
qvfperm qaligned, qmem1, qmem2, qalign In these sets of instructions, qvlpclsx and qvlpcldx are used to determine the alignment of the floating point values stored at a memory address represented by the sum of general purpose registers ra and rb and determine an alignment mask control word that is stored in qalign. The alignment mask control word essentially identifies how far away from an element boundary the data value is that is to be loaded. In this exemplary embodiment, qvlpcldx represents computing an alignment control word for double precision elements and without stepping factor, and qvlplsx represents computing an alignment control word for single precision elements with a stepping factor of 2.

The instructions qvlfsux and qvlfdux are used to load the data values from memory based on the addition of general purpose register ra with general purpose register rb. Those skilled in the art will understand how to provide additional instructions based on different "addressing modes" known to those skilled in the art and employ these addressing modes within the scope of the illustrative embodiments to compute alignment control words based on the teachings contained herein.

Referring now to instructions qvlfdux and qvlfsux, respectively, quad vector load floating point instructions are used to load double and single precision quad vectors from memory. Specifically, the qvlfdux adds general registers RA and RB to use as memory address, and addresses memory, while truncating the received address to address a naturally aligned 32 byte memory block containing at least the first naturally aligned double precision vector element. The specified instruction uses an x-form load, i.e., indexed addressing by adding registers RA and RB to obtain a memory address. The instructions further exploits the update for of load instruction, writing back the (non-truncated) sum of general purpose registers RA and RB back to general purpose register RA. In one preferred exemplary sample sequence update forms are used to load two consecutive double precision quad vectors by initializing general purpose register RB with the value 32.

Those skilled in the art will understand other ways of loading two successive 32 byte memory blocks and will be able to apply alternative ways of loading two successive memory blocks within the scope of the present invention. Specifically, the qvlfsux adds general purpose registers RA and RB to use as memory address, and addresses memory, while truncating the received address to address a naturally aligned 16 byte memory block containing at least the first naturally aligned double precision vector element. The specified instruction uses an x-form load, i.e., indexed addressing by adding registers RA and RB to obtain a memory address. The instructions further exploits the update for of load instruction, writing back the (non-truncated) sum of general purpose registers RA and RB back to general purpose register RA. In one preferred exemplary sample sequence update forms are used to load two consecutive double precision quad vectors by initializing general purpose register RB with the value 16.

Those skilled in the art will understand other ways of loading two successive 16 byte memory blocks and will be able to apply alternative ways of loading two successive memory blocks within the scope of the present invention. Those skilled in the art will understand how to provide additional instructions based on different "addressing modes" known to those skilled in the art and employ the addressing modes within the scope of the present invention to the computation of alignment control words based on the teachings contained herein.

Different instructions are used to determine the alignment and to load the data values because, for a 32 byte vector register with a quad-processing unit in which there are 4 elements per vector register, each element in the vector register has 8 bytes for double precision floating point data values but each single precision floating point data value has 4 byte boundaries. The double precision alignment determination instruction qvlpcdx determines what element of the four elements that the data value is present in and aligns the data value according to the double precision 8-byte elements. The single precision alignment determination instruction determines the element of the four elements that the data value is present in based on a conversion of the 4 byte single precision boundary to the 8-byte element boundaries.

Once the alignment of the values is determined and the data values are loaded, a quad-processing vector floating point permute operation qvfperm is executed on the data values stored in qmem1 and qmem2 based on the determined alignment qalign. That is, qmem1 and qmem2 may be the input vectors for the permute logic shown in FIG. 7 with the qalign vector being the control vector for selecting elements from the input vectors qmem1 and qmem2. The result is stored in the vector register qaligned. It can be appreciated from the above that the same alignment sequence based on qvfperm is used for single precision and double precision data values once alignment information has been loaded with qvlpclsx and qvlpcldx, respectively, and data has been loaded with qvlfsux and qvldux, respectively. The operation described by qvlpclsx and qvlpcldx can be implemented in hardware, such as by an element computation circuit and provided as an instruction, or in software, such as by an address computation and table lookup sequence.

A circuit implementation may be obtained by synthesizing the following logic in Very High Speed Integrated Circuit (VHSIC) Hardware Description Language (VHDL):

```
memaddress    <= ra + rb;
alignment     <= memaddress(59 to 60);
controlword   <= CONTROLWORD_FOR_00_ALIGN if alignment = "00" else
                 CONTROLWORD_FOR_01_ALIGN if alignment = "01" else
                 CONTROLWORD_FOR_10_ALIGN if alignment = "10" else
                 CONTROLWORD_FOR_11_ALIGN;
```

In accordance with the VHDL definition, the constants CONTROLWORD_FOR_00_ALIGN, CONTROLWORD_ FOR_01_ALIGN, CONTROLWORD_FOR_ 10_ALIGN, CONTROLWORD_FOR_11_ALIGN correspond to the four alignment mask values for a four element vector.

An exemplary implementation in software, using the C programming language for example, can be obtained by compiling code corresponding to the following "C" language code fragment:

```
extern controlword_t controlword_array[ ];
address_t memaddress, ra;
int rb;
unsigned alignment;
controlword_t controlword;
memaddress =      ra + rb;
alignment =       (memaddress >> 3) & 0x03;
controlword =     controlword_array[alignment];
```

In accordance with the "C" language definition, address_t is a data type holding a memory address, controlword_t is a data type to hold a controlword (e.g., in a format described herein below with reference to preferred exemplary implementation), and controlword_array is an array consisting of at least 4 elements corresponding to the controlword to be loaded for alignments 00, 01, 10, 11 (vector positions decimal 0, 1, 2, and 3, respectively).

Those skilled in the art will understand how to apply the teachings contained herein to different vector lengths, addressing modes, controlword encodings, and so forth, within the scope of the present invention.

Figure 9:
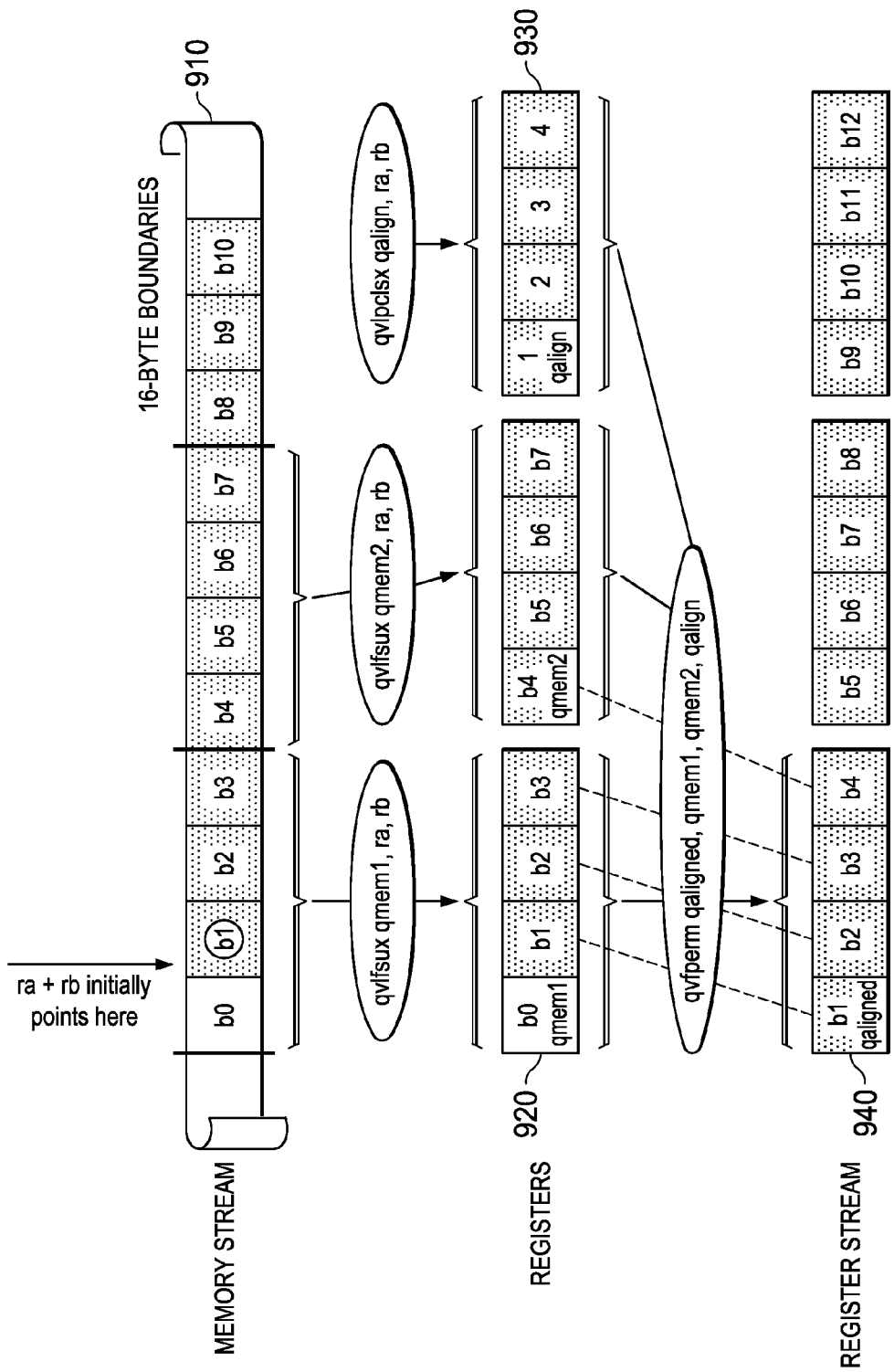
FIG. 9 is an exemplary diagram illustrating the data alignment performed for single precision data values in accordance with one illustrative embodiment.

FIG. 9 is an exemplary diagram illustrating the data alignment performed for single precision data values in accordance with one illustrative embodiment. In FIG. 9, and FIGS. 10, 13, and 14 hereafter, the shaded portions represent used data values whereas unshaded portions represent unused data values. In accordance with one illustrative embodiment of a floating point SIMD architecture, the control word, discussed hereafter with regard to FIGS. 9 and 10, is encoded in a floating point format. In one illustrative embodiment, the floating point format used to encode alignment information uses a predefined exponent value and encodes the alignment information as part of the mantissa. In one of these illustrative embodiments, the alignment information is encoded in the high-order mantissa bits. Those skilled in the art will understand that other encodings can be used to describe alignment based on the teachings contained herein, including those that use one or more of exponent bits, sign bits, and lower order mantissa bits.

The data alignment is performed with regard to the execution of the statement (prior to SIMD code generation) "for (i=0; i<64; i++)a[i+2]b[i+1]+c[i+3]". The memory stream 910 has elements b0 to b10 shown, but element b0 is not utilized by the statement. To the contrary, the vector of data values starts with the second element b1 (corresponding to i=0). As shown in FIG. 9, in one exemplary sequence ra+rb has been initialized to point to b1 in accordance with an exemplary execution sequence. The qvlfsux load instructions load the first and second 16 byte single precision words into the double precision vector registers qmem1 and qmem2 920, respectively. As a result, qmem1 stores the elements b0, b1, b2, and b3 while qmem2 stores the elements b4, b5, b6, and b7.

The qvlpclsx instruction generates a control word 930 based on the element alignment relative to a 4-element single precision vector boundary in memory. This control word 930 indicates that the beginning of the first 4-element vector value is b1, i.e. the second element in qmem1. Thus, based on the control word 930 generated by qvlpclsx, the permute operation qvfperm left shifts the values stored in qmem1 and qmem2 by one element to obtain the register stream 940 shown. As shown in FIG. 9, the register stream 940 comprises all values of the b array used by the original statement.

FIG. 10 is an exemplary diagram illustrating the data alignment performed for double precision data values in accordance with one illustrative embodiment. In comparison with FIG. 9, in FIG. 10 no expansion takes place, and ra and rb point to a different address from that shown in FIG. 9. The first element b1 in the example of FIG. 9 is of the form 16n+4 and a control word of "1234" is obtained. In FIG. 2, the address of the first element b1 is 32n+8, and the control word of "1234" is also obtained because the qvlpcldx and qvlpclsx functions are cognizant of data types and apply the appropriate step up factors internally.

Alignment information is recorded as a control word and may be encoded as a floating point number and stored in a quad vector register. Advantageously, encoding the control word as a floating point number allows the control word to be stored in the FP SIMD vector register file. That is, the control word does not need to be stored in the register file as integer information such that this integer information is processed using arithmetic, logic, permutation, or other such similar computational instructions, as has been used to encode control words as integer control words in prior art mixed integer/floating point SIMD ISAs.

In one illustrative embodiment, the alignment information may be encoded in the mantissa of the floating point number. High order mantissa bits may be used in order to simplify and synergistically amplify predictability optimizations and allow permute control information to be spilled to a single precision vector storage location thereby reducing memory foot print and increasing cache effectiveness. In the context of the present description, predictability optimizations essentially put the bits of the alignment information where they are easy to find. The illustrative embodiments use an exponent that ensures that each number has only a single representation, with the selection of an appropriate mantissa helping in this regard. Other suitable positions of the bits of the alignment information may be utilized without departing from the spirit and scope of the illustrative embodiments.

The term "spilling into a single precision" as it is used herein means that if a store needs to be performed, the store can be done using a single precision. Single precision only stores a subset of mantissa bits, i.e. the high order mantissa bits. The term "cache effectiveness" refers to the fact that storing a 32 byte single precision value is more effective than storing 64 byte values since it allows twice as much information to be stored in the same number of bits. The term "simplified verification" as it is used herein refers to the fact that if the bits are in one location only, it is easier to verify those bits because only one possible location and one possible execution scenario corresponding to information being in one fixed location, needs to be verified. The term "simplified debugging" as it is used herein refers to the fact that predictability aids debugging because only one possible location and one possible execution scenario corresponding to information being in one fixed location can occur. This reduces the number of scenarios that may occur and need to be considered during debugging. This in turn limits the number of possible "bugs" to bugs that are in only one scenario.

As shown in FIG. 11, one double precision value in each vector slot may specify the source for that slot using its most significant mantissa, or fraction, bits. In the depicted example, the 3 most significant fraction bits are used to store the alignment information that specifies the source for that slot of the vector register. In one preferred embodiment, a specific exponent, such as hex 400 or higher, is chosen for the vector so as to avoid complicating debugging, verification, and to improve result predictability. If a permute control word does not have such an exponent, the permute instruction may generate a predetermined default value in a target vector slot not corresponding to a properly formatted vector permute control word, or an implementation defined value.

In accordance with one exemplary implementation of the illustrative embodiment, only the single bit position corresponding to the bit 0x400 is tested to simplify critical paths. If the bit is not set, the vector control value may correspond to a number in a range possibly having multiple internal representations in one exemplary embodiment having chosen an internal representation format to simplify loading and extension of single precision values to double precision values, such that de-normalized single precision numbers may be represented as non-normalized double precision numbers even when such numbers may be represented as a normalized double precision number. On the other hand, if the bit is set, the vector control value cannot correspond to a number in a range possibly having multiple internal representations, in one such exemplary embodiment. As a result, the mantissa is not consulted and a value of 0.0 is returned in the target vector slot. If the bit is set, the vector control value cannot correspond to a number in a range possibly having multiple internal representations. As a result, the mantissa is consulted and the 3 most significant bits of the mantissa are used to perform a select operation as discussed above. This yields the architecturally defined behavior for the exponent of 0x400, and a reproducible output (corresponding to that of cases where the exponent would have been 0x400) for any exponent values in the exponent 0x401 to 0x4FF range. In one exemplary embodiment, no reference is made to low-order mantissa bits, and their values are inconsequential on the behavior of the quad vector float permute instruction qvfperm.

Figure 12:
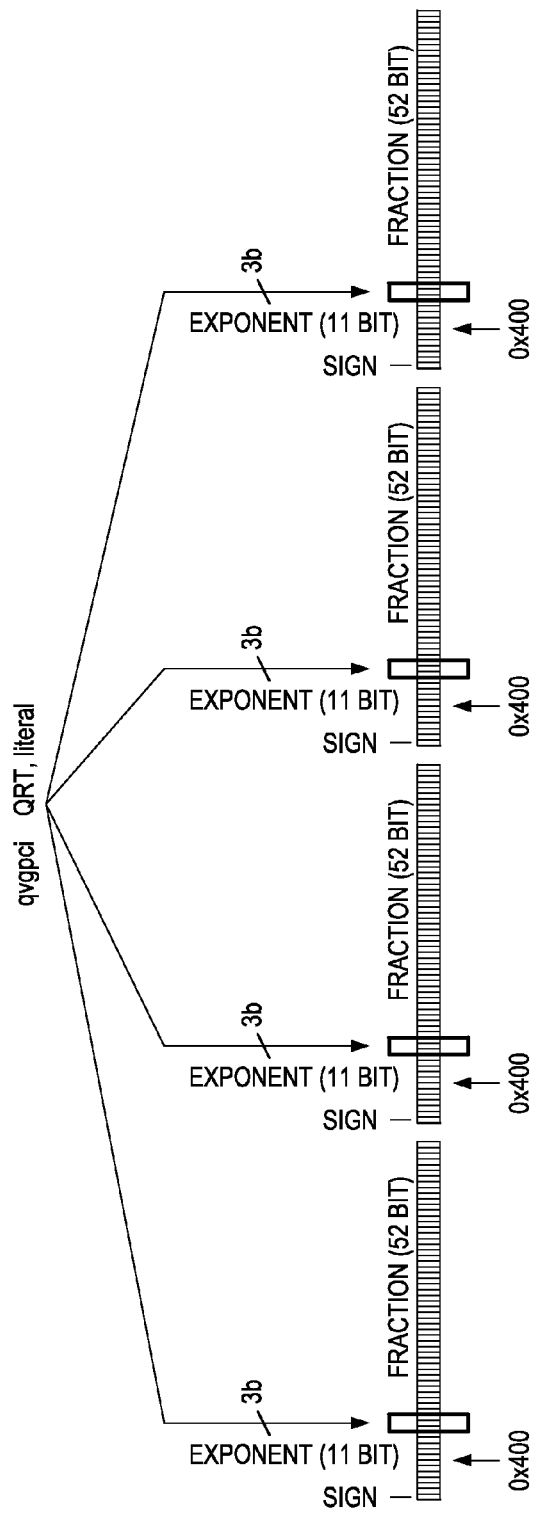
FIG. 12 is an exemplary diagram illustrating a generate vector permute control word immediate instruction (qvgpci) in accordance with one illustrative embodiment.

In addition to the above, additional capabilities are provided by the illustrative embodiments including the ability to generate a vector permute control word immediately. As shown in FIG. 12, to efficiently load a vector permute control word known by the compiler or the application programmer, a generate vector permute control word immediate instruction qvgpci is provided. As shown, the instruction generates a 4 element vector of double precision values which is properly formatted as a vector permute control word, i.e., the exponent is initialized to 0x400, and 3 bits are loaded into the most significant mantissa bits of each vector slot while zeroing the remaining mantissa bits.

Those skilled in the art will understand that this instruction allows programmers (or compilers) to generate a small set of floating point vectors from within a single instruction, and specifically those with normalized double precision numbers with an exponent of 0x400, arbitrary 3 most significant mantissa bits, and zero mantissa bits for the remaining mantissa, corresponding to vector control words.

In one illustrative embodiment, a programmer or compiler may desire to load such a floating point vector to initialize a permute control word for a specific permutation pattern. In another usage pattern, this instruction can be used to load a set of these floating point values for other computational needs. More features and elements of this instruction will be evident with reference to the instruction specification contained in the attached exemplary embodiment of an advanced FP-only SIMD instruction set in accordance with the present invention as set for by the QPX specification in Appendix A of this document.

In addition to the vector permute control word immediate, additional instructions for other data reorganization operations including shift instructions, splat instructions, and similar instructions can be provided in exemplary embodiments using a common hardware implementation. For example, the qvaligni (vector align immediate) instruction is provided for selecting a statically determined subvector from a concatenation for two vectors to generate a new target vector in one exemplary embodiment. More features and elements of this instruction will be evident with reference to the instruction specification contained in the attached exemplary embodiment of an advanced FP-only SIMD instruction set in accordance with the present invention as set for by the QPX specification in Appendix A of this document.

As another example, the qvesplati (element splat) instruction selects a statically determined element from a vector and replicates it into all slots in the target vector. It should be noted that this can also be used to replicate a scalar value in the preferred slot into all positions of a target vector to create a vector from a scalar value. More features and elements of this instruction will be evident with reference to the instruction specification contained in the attached exemplary embodiment of an advanced FP-only SIMD instruction set in accordance with the present invention as set for by the QPX specification in Appendix A of this document.

As with the compare, Boolean, logic, and select instructions of the FP only SIMD ISA of the illustrative embodiments, a compiler may implement the alignment shift operations and instructions described above to perform dynamic data-driven alignment of floating point vector data. That is, the compiler may analyze the original code and insert alignment code into the optimized code for dynamically aligning the vector data using the above vector alignment instructions when vector instructions are created. This alignment code may shift streams of data loaded from memory such that the resulting register streams are aligned for proper operation of vector logic instructions in accordance with the illustrative embodiments.

Figure 13:
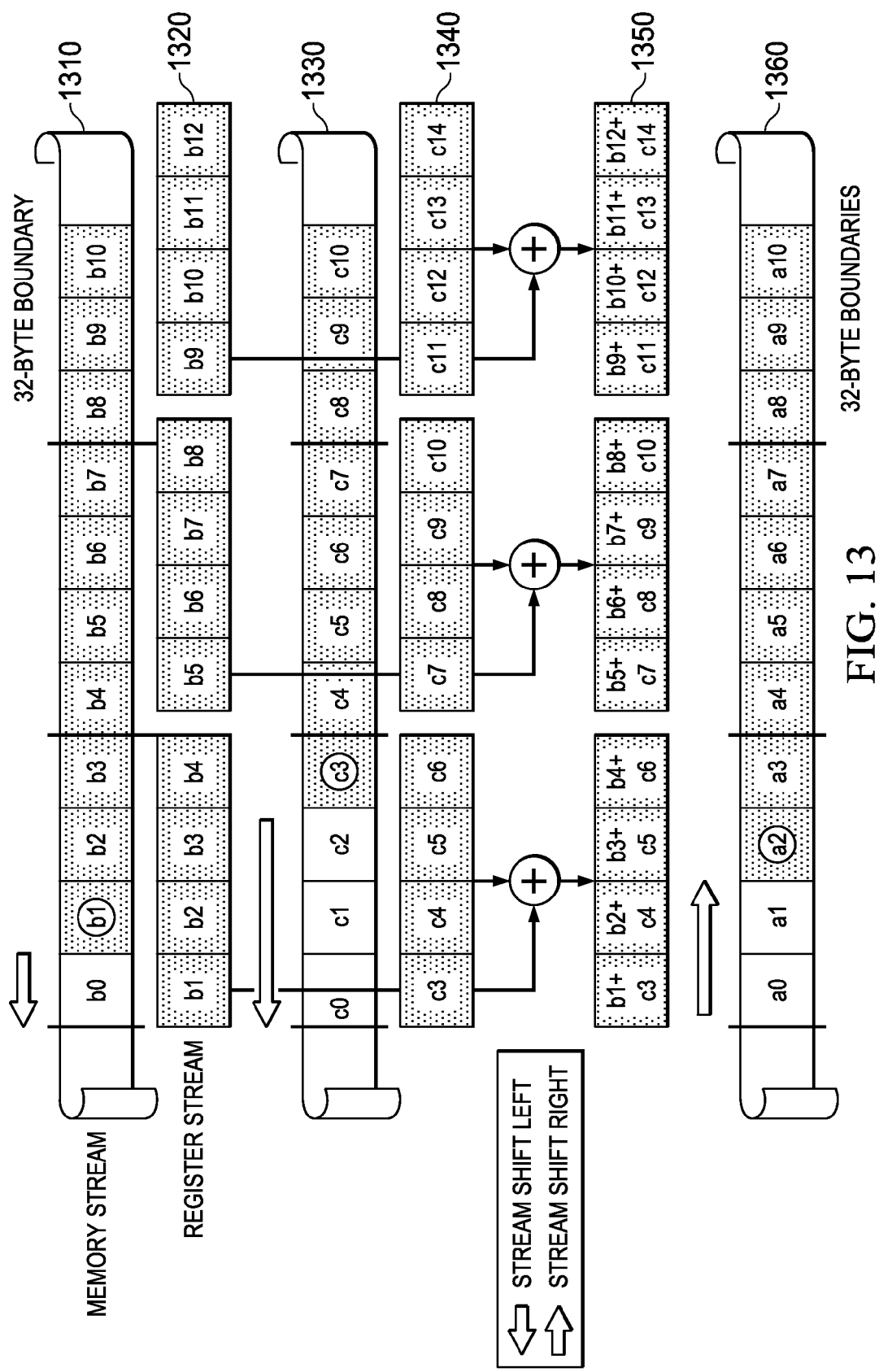
FIG. 13 is an exemplary diagram illustrating a data alignment problem for SIMD execution of an example original code statement.

In addition to simply aligning two vectors for performance of a vector logic operation, the alignment code may take into consideration all of the memory streams involved in an original code statement before determining proper alignment of the memory streams to achieve optimized execution. FIG. 13 is an exemplary diagram illustrating a data alignment problem for SIMD execution of an example original code statement. The example shown in FIG. 13 is for the execution of the scalar statement "for (i=0; i<64; i++)a[i+2]=b[i+1]+c[i+3]" in a SIMD fashion. As shown in FIG. 13, in order to perform a vector addition according to this statement, in an non-optimized fashion, a first memory stream 1310 for the array b[i+1] must be shifted left 1 vector element to achieve the register stream 1320. A second memory stream 1330 for the array c[i+3] must be shifted left 3 vector elements to achieve register stream 1340. The two register streams may then be added using a quad-processing vector logic instruction in accordance with the illustrative embodiments such that b1 is added to c3, b2 is added to c4, etc. and the register stream 1350 is obtained. The results must then be written to memory 1360 by shifting the result right by 2 vector elements such that the a2 element has the value of b1+c3.

Figure 14:
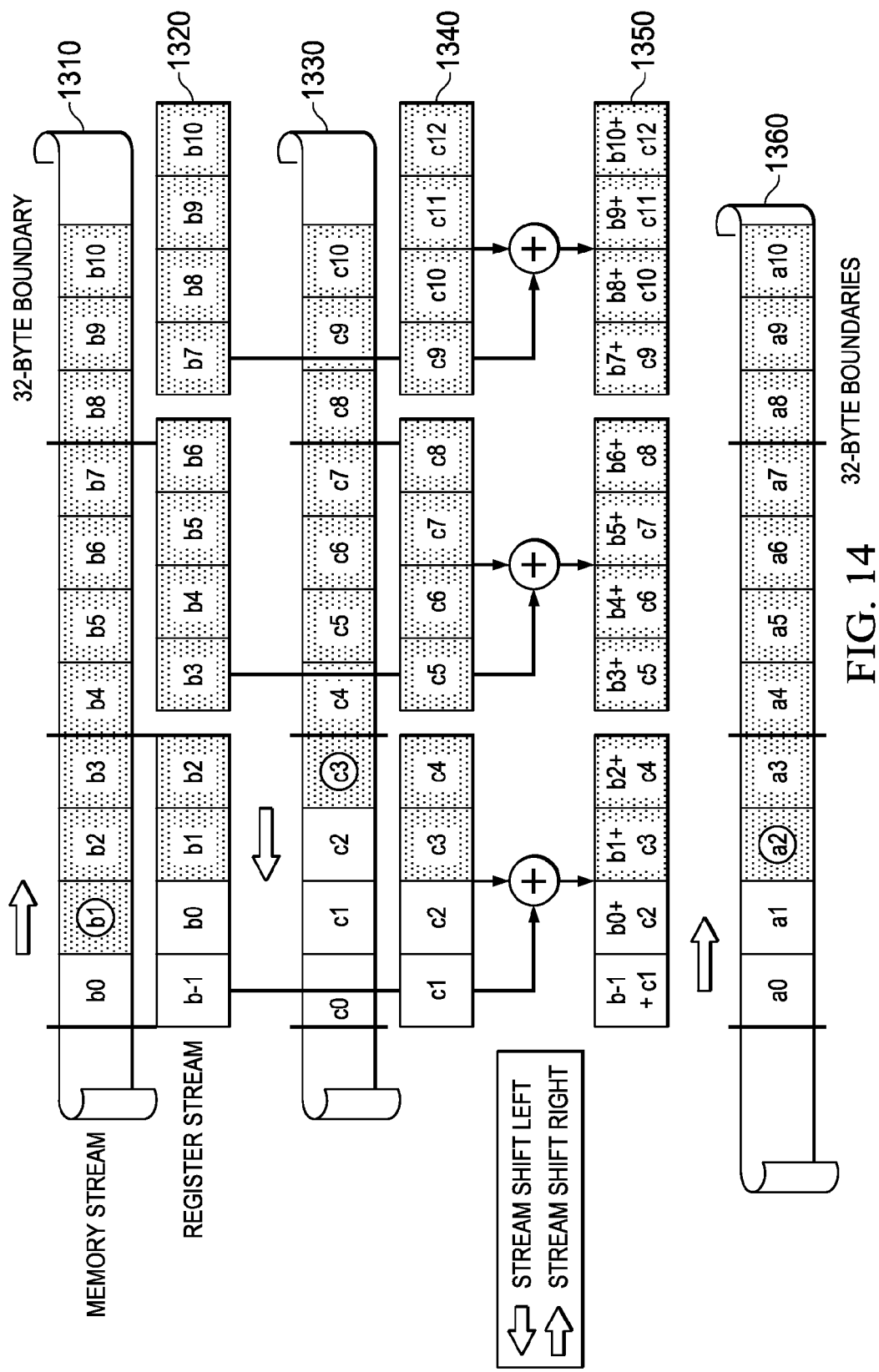
FIG. 14 illustrates an alternative data alignment sequence to that of FIG. 13 for an optimized data alignment in which the amount of data shifting is minimized.

The dynamic data-driven alignment instructions of the illustrative embodiments may seek to minimize the amount of shifting so as to reduce execution cycles. FIG. 14 illustrates an alternative data alignment sequence to that of FIG. 13 for an optimized data alignment in which the amount of data shifting is minimized. As shown in FIG. 14, rather than shifting the memory stream 1310 to the left by 1 vector element, the second memory stream 1330 by 3 vector elements, and the memory stream 1360 by 2 vector elements, the shifting is minimized by taking into consideration the final placement of the results of the vector logic instructions as well as the misalignment of the vectors involve in the vector logic instructions. Thus, with this alternative embodiment, the memory stream 1310 is shifted to the right by one vector element, the memory stream 1330 is shifted to the left by one vector element, and no shifting is necessary to write the results to memory stream 1360. In this way, all of the vectors a[i+2], b[i+1], and c[i+3] are aligned with minimum shifting.

Figure 15:
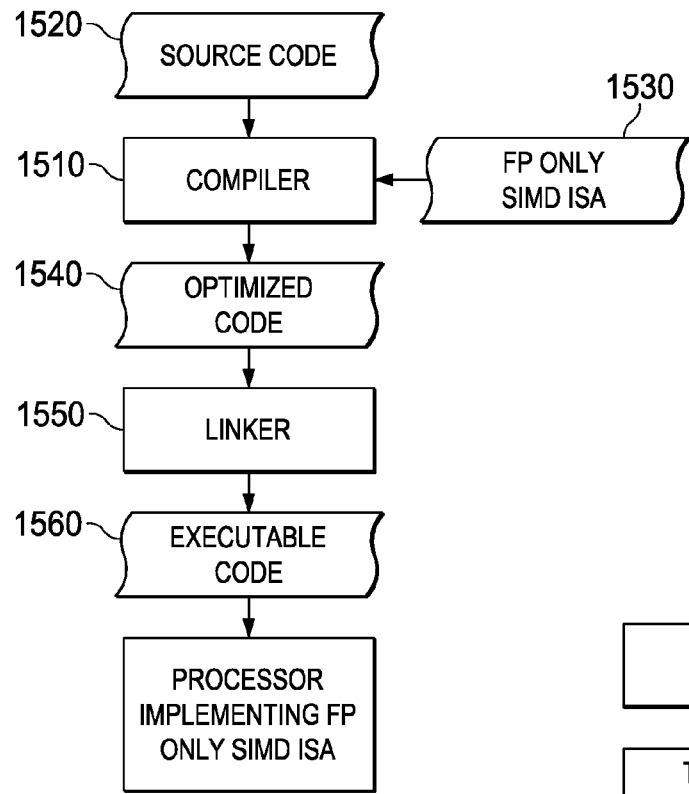
FIG. 15 is a block diagram illustrating a compiler optimization in accordance with one illustrative embodiment.

The FP only SIMD ISA described above is utilized by a compiler to optimize original source code into optimized executable code that utilizes the functionality of the FP only SIMD ISA logic present in the quad-processing unit (QPU) and the vector register file of the processor architecture implementing the FP only SIMD ISA. FIG. 15 is a block diagram illustrating a compiler optimization in accordance with one illustrative embodiment. As shown in FIG. 15, the compiler 1510 receives original source code 1520 which is analyzed in accordance with source code patterns associated with the FP only SIMD ISA 1530 for which the compiler 1510 is configured. The compiler 1510 identifies portions of the source code 1520 that meet the source code patterns corresponding to FP only SIMD ISA instructions 1530.

The compiler then transforms the source code to utilize the FP only SIMD ISA 1530. This may involve performing data-parallel if conversion using FP only vector compare instructions, FP only vector Boolean instructions/data values, logic instructions, select instructions, and the like, as illustrated above. Moreover, the transformation may involve incorporating dynamic data-driven alignment instructions into the executable code as illustrated above. The result is optimized code 1540 that implements the FP only SIMD ISA of the illustrative embodiments which is then provided to linker 1550 that performs linker operations, as are generally known in the art, to thereby generate executable code 1560. The executable code 1560 may then be executed by the processor architecture of FIG. 3, for example, that implements the FP only SIMD ISA.

Figure 16:
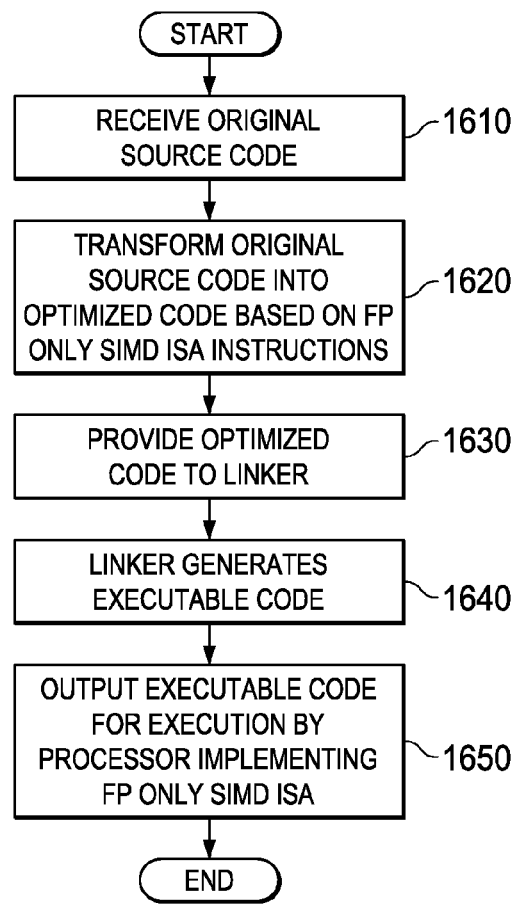
FIG. 16 is a flowchart outlining an exemplary operation for compiling source code into executable code in accordance with one illustrative embodiment.

FIG. 16 is a flowchart outlining an exemplary operation for compiling source code into executable code in accordance with one illustrative embodiment. As shown in FIG. 16, the operation starts by receiving original source code (step 1610). The compiler transforms the original source code into optimized code based on the FP only SIMD ISA compare, Boolean, logic, select, and dynamic alignment vector instructions (step 1620). The optimized code is provided to a linker (step 1630). The linker links the optimized code modules, libraries, etc. and generates executable code (step 1640). The executable code is output for execution by a processor implementing the FP only SIMD ISA (step 1650). The operation then terminates.

Thus, the illustrative embodiments provide mechanisms for implementing a floating point only single instruction multiple data instruction set architecture. The illustrative embodiments provide FP only SIMD instructions for performing compare operations, Boolean operations, logic operations, select operations, and dynamic data-driven alignment instructions. To support such FP only SIMD ISA instructions, a single vector register file is utilized in which all data, scalar and vector, is stored in vector registers having four vector elements. Each vector element, in a preferred embodiment stores floating point values having a double precision format. Single precision data values are automatically converted to double precision by load operations through precision expansion.

In one illustrative embodiment, there is provided a storage medium containing a computer program for implementing one or more of the compiler optimizations of FIGS. 15 and 16. In another illustrative embodiment, there is provided a computer program containing at least one FP SIMD instruction. In one embodiment, the at least one FP SIMD instruction comprises one of a floating point permute instruction in accordance with the teachings contained herein, a floating point Boolean instruction in accordance with the teachings contained herein, a floating point compare instruction generating a floating point Boolean result, a sequence of instructions for aligning vectors of at least one precision, any of the instructions contained in Appendix A, or any combination of these various types of instructions. The computer storage medium containing one or more of these computer programs is a tangible computer storage medium. The computer program, in accordance with some embodiments of the present invention, supports and/or implements the performance of any of the operations detailed above with regard to the illustrative embodiments and, in some embodiments, the generation, use, and storage of one or more instructions of a FP only SIMD ISA as described above and in Appendix A.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A processor, comprising:
    an issue unit;
    an execution unit coupled to the issue unit; and
    a vector register file coupled to the execution unit, wherein:
    the execution unit has floating point (FP) single instruction multiple data (SIMD) instruction set architecture (ISA) hardware logic that executes instructions that process floating point numbers in a SIMD arrangement from the vector register file,
    floating point vector registers of the vector register file store both scalar and floating point values as vectors having a plurality of vector elements, and
    the execution unit has hardware logic that uses an encoding scheme for a selection operation and Boolean logic operations that causes the selection operation and Boolean logic operations to be performed using a floating point vector data format for both the inputs and outputs of the selection operation and Boolean logic operations, wherein the processor does not provide support for integer encoding of data for the storage of comparison results, Boolean operations, performing selection operations, and performing data alignment operations.

2. The processor of claim 1, wherein the issue unit is a quad-processing execution unit issue unit that issues a vector to the execution unit as four data elements, the execution unit is a quad-processing execution unit that executes the four data elements concurrently with a single instruction, and the vector register file is a quad-vector register file.

3. The processor of claim 1, wherein the processor utilizes scalar integers for control operations while all other instructions are of a vector format.

4. The processor of claim 1, wherein the selection operation is a select operation in which each floating-point operand in each slot of a first register is compared to the value zero, wherein, if the operand is greater than or equal to zero, a corresponding slot of a second register is set to the contents of a third register, and wherein if the operand is less than zero or is Not a Number (NaN), the corresponding slot of the second register is set to the contents of a fourth register.

5. The processor of claim 1, wherein the FP SIMD ISA has a legacy scalar ISA overlaid on the FP SIMD ISA such that scalar instructions may be executed using the floating point vector registers of vector register file, and wherein scalar instructions operate on a preferred slot of the floating point vector registers with other slots of the floating point vector registers not being used with the scalar instructions.

6. The processor of claim 5, wherein scalar floating point computations are computed with the scalar instructions in the preferred slot of the floating point vector registers and results of scalar computations are used directly as input to vector instructions in response to the results being stored in the preferred slot of the floating point vector registers.

7. The processor of claim 1, wherein the execution unit executes four operations, one operation on each of four slots of a first floating point vector register and corresponding four slots of a second floating point vector register, approximately simultaneously with results of these four operations being written to corresponding slots of a third floating point vector register.

8. The processor of claim 1, wherein the execution unit comprises permute hardware logic for performing a permute functionality on naturally aligned floating point vector register elements stored in a floating point vector register, at a vector element granularity.

9. The processor of claim 1, wherein all computation on data is supported on vectors consisting of values in floating point format only and other data types not being in floating point format are only used for the purpose of moving the data without reference to their format, as input to convert a data value to a floating point format, or as output from a convert operation for converting the data value to the floating point format.

10. The processor of claim 9, further comprising processing a single scalar value in the floating point format stored in a floating point vector register.

11. The processor of claim 9, wherein all data stored in the vector register file corresponds to a single floating point representation, the single floating point representation corresponding to one of a single precision floating point format, a double precision floating point format, or an extended precision floating point format.

12. A processor, comprising:
    an issue unit;
    an execution unit coupled to the issue unit; and
    a vector register file coupled to the execution unit, wherein:
    the execution unit has floating point (FP) single instruction multiple data (SIMD) instruction set architecture (ISA) hardware logic that executes instructions that process floating point numbers in a SIMD arrangement from the vector register file,
    floating point vector registers of the vector register file store both scalar and floating point values as vectors having a plurality of vector elements,
    the execution unit has comparison hardware logic that compares floating point vectors obtained from the issue unit and stores results of the comparison in a floating point vector register of the vector register file, and
    the comparison hardware logic computes comparison results encoded as floating point values, wherein the processor does not provide support for integer encoding of data for the storage of comparison results, performing Boolean operations, performing selection operations, and performing data alignment operations.

13. The processor of claim 12, wherein the comparison hardware logic implements a first function for comparing the two floating point vectors to determine if the two floating point vectors are equal, a second function for comparing the two floating point vectors to determine if a first floating point vector is greater than a second floating point vector, a third function for comparing the two floating point vectors to determine if the first floating point vector is less than the second floating point vector, and a fourth function for testing for a Not a Number (NaN) condition, and wherein an output of each of the first, second, third, and fourth functions is a floating point vector.

14. A data processing system, comprising:
a processor; and
a memory coupled to the processor, wherein the processor comprises:
an issue unit;
an execution unit coupled to the issue unit; and
a vector register file coupled to the execution unit, wherein:
the execution unit has floating point (FP) single instruction multiple data (SIMD) instruction set architecture (ISA) hardware logic that executes instructions that process floating point numbers in a SIMD arrangement from the vector register file,
floating point vector registers of the vector register file store both scalar and floating point values as vectors having a plurality of vector elements, and
the execution unit has hardware logic for supporting an encoding scheme for a selection operation and Boolean logic operations that causes the selection operation and Boolean logic operations to be performed using a floating point vector data format for both the inputs and outputs of the selection operation and Boolean logic operations wherein the processor does not provide support for integer encoding of data for the storage of comparison results, performing Boolean operations, performing selection operations, and performing data alignment operations.

15. The data processing system of claim 14, wherein the issue unit is a quad-processing execution unit issue unit that issues a vector to the execution unit as four data elements, the execution unit is a quad-processing execution unit that executes the four data elements concurrently with a single instruction, and the vector register file is a quad-vector register file.

16. The data processing system of claim 14, wherein the processor utilizes scalar integers for control operations while all other instructions are of a vector format.

17. The data processing system of claim 14, wherein the selection operation is a matching select operation in which each floating-point operand in each slot of a first register is compared to the value zero, wherein, if the operand is greater than or equal to zero, a corresponding slot of a second register is set to the contents of a third register, and wherein if the operand is less than zero or is Not a Number (NaN), the corresponding slot of the second register is set to the contents of a fourth register.

18. The data processing system of claim 14, wherein the FP SIMD ISA has a scalar ISA overlaid on the FP SIMD ISA such that scalar instructions may be executed using the floating point vector registers of vector register file, and wherein scalar instructions operate on a preferred slot of the floating point vector registers with other slots of the floating point vector registers not being used with the scalar instructions.

19. The data processing system of claim 18, wherein the data processing system executes code generated for a scalar floating point architecture specification, and wherein the scalar floating point architecture specification corresponds to a legacy specification, the code being unchanged and executing natively without requiring a compatibility mode.

20. The data processing system of claim 14, wherein the execution unit executes four operations, one operation on each of four slots of a first floating point vector register and corresponding four slots of a second floating point vector register, approximately simultaneously with results of these four operations being written to corresponding slots of a third floating point vector register.

21. The data processing system of claim 14, wherein the execution unit comprises permute hardware logic for performing a permute functionality on naturally aligned floating point vector register elements stored in a floating point vector register, at a vector element granularity.

22. A data processing system, comprising:
a processor; and
a memory coupled to the processor, wherein the processor comprises:
an issue unit;
an execution unit coupled to the issue unit; and
a vector register file coupled to the execution unit, wherein:
the execution unit has floating point (FP) single instruction multiple data (SIMD) instruction set architecture (ISA) hardware logic that executes instructions that process floating point numbers in a SIMD arrangement from the vector register file,
floating point vector registers of the vector register file store both scalar and floating point values as vectors having a plurality of vector elements,
the execution unit has comparison hardware logic that compares floating point vectors obtained from the issue unit and stores results of the comparison in a floating point vector register of the vector register file, and
the comparison hardware logic computes comparison results encoded as floating point values, wherein the processor does not provide support for integer encoding of data for the storage of comparison results, performing Boolean operations, performing selection operations, and performing data alignment operations.

23. The data processing system of claim 22, wherein the comparison hardware logic implements a first function for comparing the two floating point vectors to determine if the two floating point vectors are equal, a second function for comparing the two floating point vectors to determine if a first floating point vector is greater than a second floating point vector, a third function for comparing the two floating point vectors to determine if the first floating point vector is less than the second floating point vector, and a fourth function for testing for a Not a Number (NaN) condition, and wherein an output of each of the first, second, third, and fourth functions is a floating point vector.

* * * * *